US012561271B2

(12) United States Patent
Jung et al.

(10) Patent No.: US 12,561,271 B2
(45) Date of Patent: Feb. 24, 2026

(54) COMPUTING SYSTEMS HAVING CONGESTION MONITORS THEREIN AND METHODS OF CONTROLLING OPERATION OF SAME

(71) Applicant: Samsung Electronics Co., Ltd., Suwon-si (KR)

(72) Inventors: Jin Jung, Suwon-si (KR); Younghyun Lee, Suwon-si (KR); Yongsuk Kwon, Suwon-si (KR); Kyungsoo Kim, Suwon-si (KR); Jinin So, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 18/460,954

(22) Filed: Sep. 5, 2023

(65) Prior Publication Data

US 2024/0281402 A1    Aug. 22, 2024

(30) Foreign Application Priority Data

Feb. 16, 2023    (KR) ........................ 10-2023-0020530

(51) Int. Cl.
*G06F 13/42* (2006.01)
*G06F 13/16* (2006.01)
*G06F 13/36* (2006.01)

(52) U.S. Cl.
CPC .................... *G06F 13/4282* (2013.01); *G06F 2213/0002* (2013.01)

(58) Field of Classification Search
CPC ......... G06F 13/4282; G06F 2213/0002; G06F 13/4221; G06F 13/1663; G06F 13/36; G06F 2213/0026
(Continued)

(56) References Cited

U.S. PATENT DOCUMENTS

| | | | |
|---|---|---|---|
| 6,044,438 A | 3/2000 | Olnowich | |
| 7,209,489 B1 * | 4/2007 | Bailey ................. | H04L 47/2425 710/39 |

(Continued)

FOREIGN PATENT DOCUMENTS

| | | |
|---|---|---|
| CN | 103916326 A | 7/2014 |
| CN | 105657066 A | 6/2016 |

(Continued)

*Primary Examiner* — Idriss N Alrobaye
*Assistant Examiner* — Henry W Yu
(74) *Attorney, Agent, or Firm* — Wolf, Greenfield & Sacks, P.C.

(57) ABSTRACT

A computing system includes an interconnect device, a plurality of memory devices electrically coupled to communicate with the interconnect device, a plurality of host devices electrically coupled to communicate with the interconnect device and configured to generate requests for access to the plurality of memory devices via the interconnect device, and a plurality of congestion monitors. These congestion monitors are configured to generate congestion information by monitoring a congestion degree of signal transfers with respect to at least one of the plurality of memory devices and the interconnect device in real time. The computing system is also configured to control at least one of: a memory region allocation of the plurality of host devices to the plurality of memory devices, and a signal transfer path inside the interconnect device, based on the congestion information.

20 Claims, 23 Drawing Sheets

(58) Field of Classification Search
  USPC ....... 710/6, 15, 18, 28, 29, 33, 60, 105, 107
  See application file for complete search history.

(56)                    References Cited

U.S. PATENT DOCUMENTS

| | | | |
|---|---|---|---|
| 8,190,843 | B1 | 5/2012 | De et al. |
| 8,804,711 | B2 | 8/2014 | Aybay et al. |
| 9,575,919 | B2 | 2/2017 | Akaike et al. |
| 9,984,017 | B2 | 5/2018 | Nair |
| 10,146,446 | B1 | 12/2018 | Anchi et al. |
| 10,341,285 | B2 * | 7/2019 | Warfield ................ H04L 45/74 |
| 10,705,961 | B2 | 7/2020 | Liu et al. |
| 10,761,752 | B1 * | 9/2020 | Narayanan ........... G06F 3/0644 |
| 11,005,929 | B1 | 5/2021 | Chamarajanagar et al. |
| 11,024,064 | B2 | 6/2021 | Muhsin et al. |
| 11,212,286 | B2 | 12/2021 | Schmitt et al. |
| 11,741,039 | B2 | 8/2023 | Jeon |
| 2016/0269322 | A1 | 9/2016 | Nakagawa |
| 2017/0005953 | A1 * | 1/2017 | Bracha ............... H04L 49/9084 |
| 2017/0269969 | A1 * | 9/2017 | Nagase .................. G06F 9/505 |
| 2018/0083954 | A1 | 3/2018 | Wang |
| 2018/0373636 | A1 * | 12/2018 | Roh .................... G06F 12/0866 |
| 2019/0058676 | A1 * | 2/2019 | Campana ............... H04N 23/90 |
| 2022/0004488 | A1 | 1/2022 | Paul et al. |
| 2022/0124035 | A1 | 4/2022 | Lee et al. |
| 2022/0179696 | A1 | 6/2022 | Dawkins et al. |
| 2022/0197819 | A1 | 6/2022 | Kumar et al. |
| 2022/0222010 | A1 | 7/2022 | Bachmutsky et al. |
| 2022/0311711 | A1 | 9/2022 | Jepsen et al. |
| 2022/0321478 | A1 | 10/2022 | Vasudevan et al. |
| 2022/0365879 | A1 * | 11/2022 | Kumar ............... G06F 12/0875 |
| 2022/0405212 | A1 * | 12/2022 | Kakaiya ............. G06F 12/1425 |

FOREIGN PATENT DOCUMENTS

| | | |
|---|---|---|
| CN | 111010865 A | 4/2020 |
| CN | 111989681 A | 11/2020 |
| CN | 115114013 A | 9/2022 |
| KR | 20220066693 A | 5/2022 |
| TW | 360835 B | 6/1999 |
| TW | 201528132 A | 7/2015 |
| TW | 202238399 A | 10/2022 |

* cited by examiner

FIG. 2

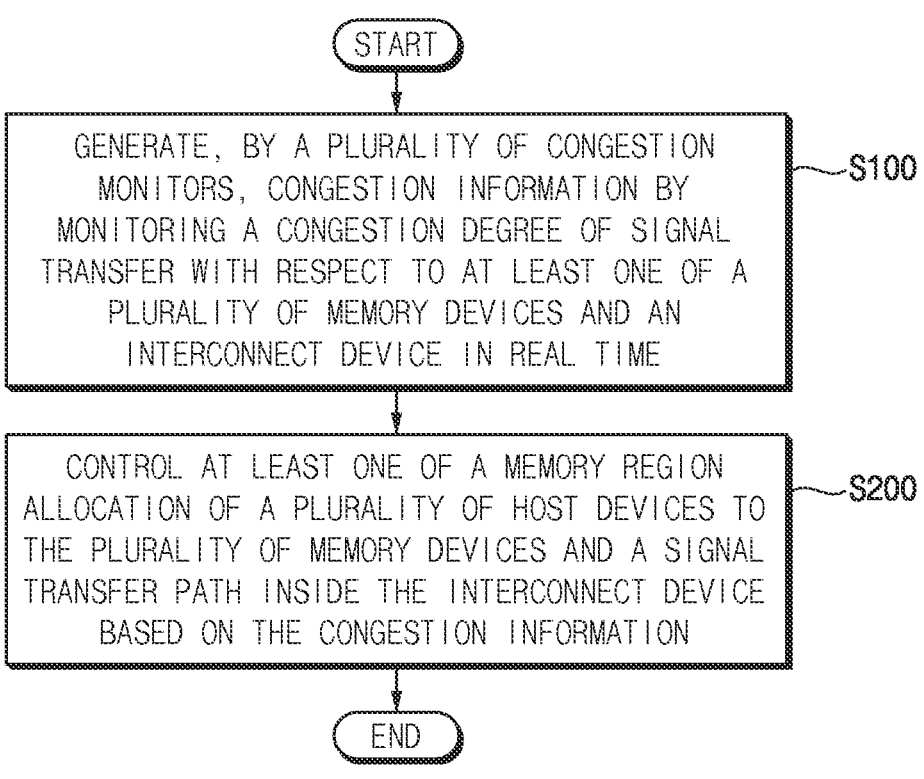

START

GENERATE, BY A PLURALITY OF CONGESTION
MONITORS, CONGESTION INFORMATION BY
MONITORING A CONGESTION DEGREE OF SIGNAL
TRANSFER WITH RESPECT TO AT LEAST ONE OF A
PLURALITY OF MEMORY DEVICES AND AN
INTERCONNECT DEVICE IN REAL TIME — S100

CONTROL AT LEAST ONE OF A MEMORY REGION
ALLOCATION OF A PLURALITY OF HOST DEVICES TO
THE PLURALITY OF MEMORY DEVICES AND A SIGNAL
TRANSFER PATH INSIDE THE INTERCONNECT DEVICE
BASED ON THE CONGESTION INFORMATION — S200

END

COMPUTING SYSTEMS HAVING CONGESTION MONITORS THEREIN AND METHODS OF CONTROLLING OPERATION OF SAME

REFERENCE TO PRIORITY APPLICATION

This U.S. non-provisional application claims priority under 35 USC § 119 to Korean Patent Application No. 10-2023-0020530, filed Feb. 16, 2023, the disclosure of which is hereby incorporated herein by reference.

BACKGROUND

1. Technical Field

Example embodiments relate generally to semiconductor integrated circuits and, more particularly, to computing systems and methods of controlling operations of a computing system.

2. Discussion of the Related Art

A system that performs data processing, such as a computing system, may include a central processing unit (CPU), a memory device, input-output devices, and a root complex that transmits information between devices constituting the system, and the like. As an example, the devices capable of configuring the computing system may transmit and receive requests and responses based on various types of protocols, such as peripheral component interconnect express (PCIe), compute express link (CXL), and the like.

A computing system may include a memory device, and the memory device may be shared by one or more other devices. Various types of operations may be performed during data processing, and movement of data accessed in the memory device may occur frequently. Latency may increase or interface bandwidth efficiency may decrease in the process of data transfer, thereby increasing data processing time.

SUMMARY

Some example embodiments may provide a computing system and a method of controlling operations of a computing system, which are capable of reducing signal transfer delay.

According to example embodiments, a computing system includes an interconnect, a plurality of memory devices electrically coupled to communicate with the interconnect device, a plurality of host devices, which are electrically coupled to communicate with the interconnect device and configured to generate requests for access to the plurality of memory devices. A plurality of congestion monitors are also provided, which are configured to generate congestion information by monitoring a congestion degree of signal transfers with respect to at least one of the plurality of memory devices and the interconnect device, in real time. The computing system is further configured to control at least one of a memory region allocation of the plurality of host devices to the plurality of memory devices and a signal transfer path inside the interconnect device based on the congestion information.

According to example embodiments, a computing system includes a compute express link (CXL) interconnect device including a plurality of CXL switches, a plurality of memory devices connected to the CXL interconnect device, a plurality of host devices connected to the CXL interconnect device and configured to generate requests for access to the plurality of memory devices, and a plurality of congestion monitors configured to generate congestion information by monitoring a congestion degree of signal transfer with respect to at least one of the plurality of memory devices and the CXL interconnect device in real time. The computing system is configured to control at least one of a memory region allocation of the plurality of host devices to the plurality of memory devices and a signal transfer path inside the CXL interconnect device based on the congestion information.

According to example embodiments, a method of controlling operations of a computing system, which contains a plurality of host devices and a plurality of memory devices communicating through an interconnect device, includes: (i) generating, by a plurality of congestion monitors, congestion information by monitoring a congestion degree of signal transfers with respect to at least one of the plurality of memory devices and the interconnect device in real time, and (ii) controlling at least one of a memory region allocation of a plurality of host devices to the plurality of memory devices and a signal transfer path inside the interconnect device, based on the congestion information.

The computing system and the method of controlling operations of the computing system according to example embodiments may advantageously reduce the signal transfer delay(s) and enhance performance of the computing system by monitoring memory congestion and switching congestion in real time and by allocating the memory region or changing the signal transfer path(s) based on the monitoring result.

BRIEF DESCRIPTION OF THE DRAWINGS

Example embodiments of the present disclosure will be more clearly understood from the following detailed description taken in conjunction with the accompanying drawings.

FIG. 2 is a flowchart illustrating a method of controlling operations of a computing system according to example embodiments.

3

Figure 10:
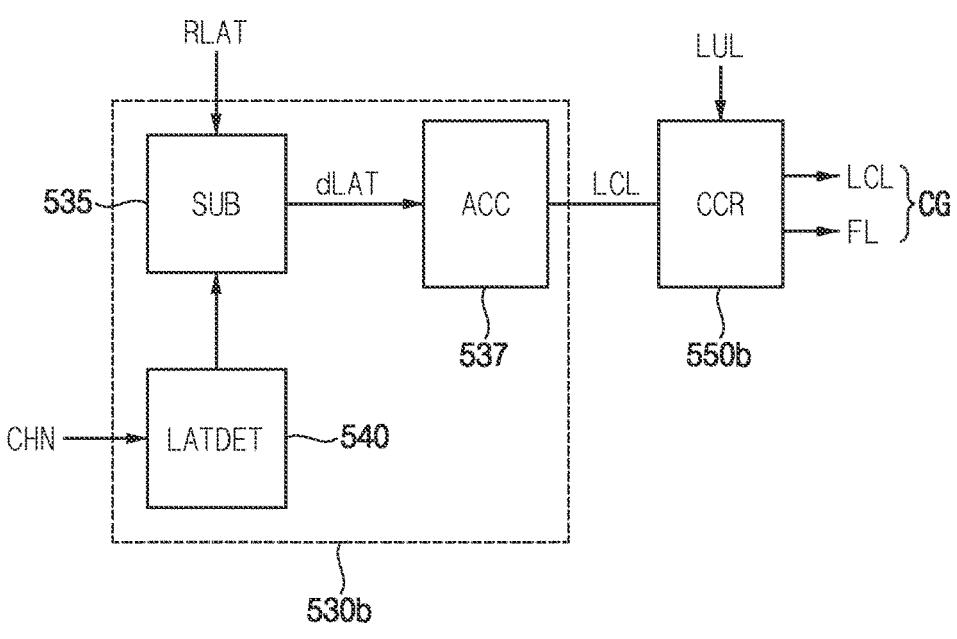
FIG. 10 is a block diagram illustrating an example embodiment of a congestion monitor using the accumulator model of FIG. 9.
Figure 11:
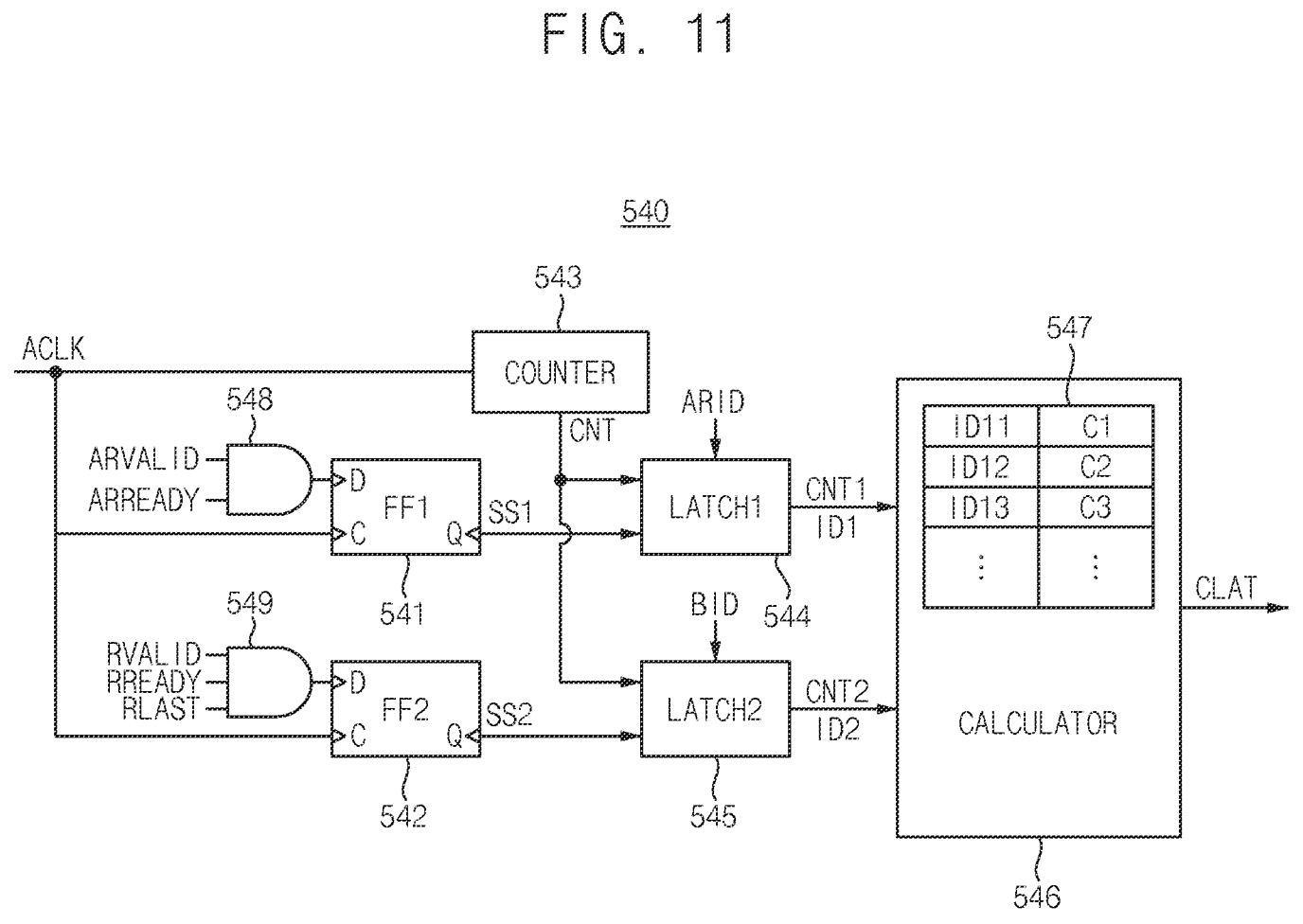

FIG. 11 is a block diagram illustrating an example embodiment of a latency detector included in the congestion monitor of FIG. 10.

Figure 12:
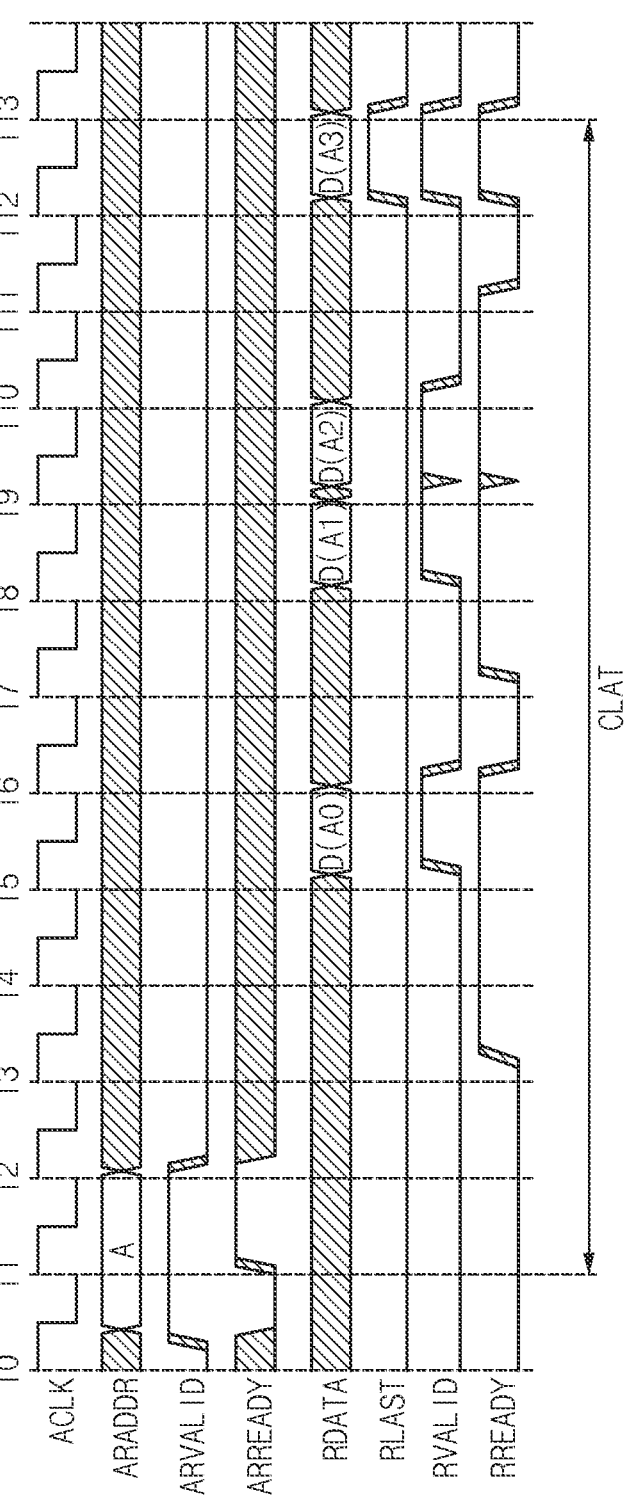

FIG. 12 is a timing diagram illustrating an exemplary transaction performed by a computing system according to example embodiments and an exemplary current latency detected by the latency detector of FIG. 11.

Figure 13:
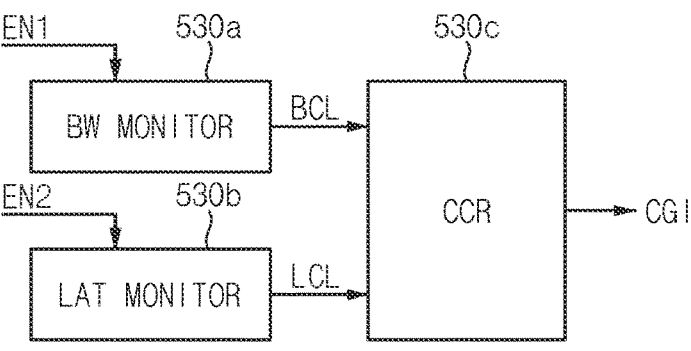

FIG. 13 is a block diagram illustrating a congestion monitor included in a computing system according to example embodiments.

Figure 14:
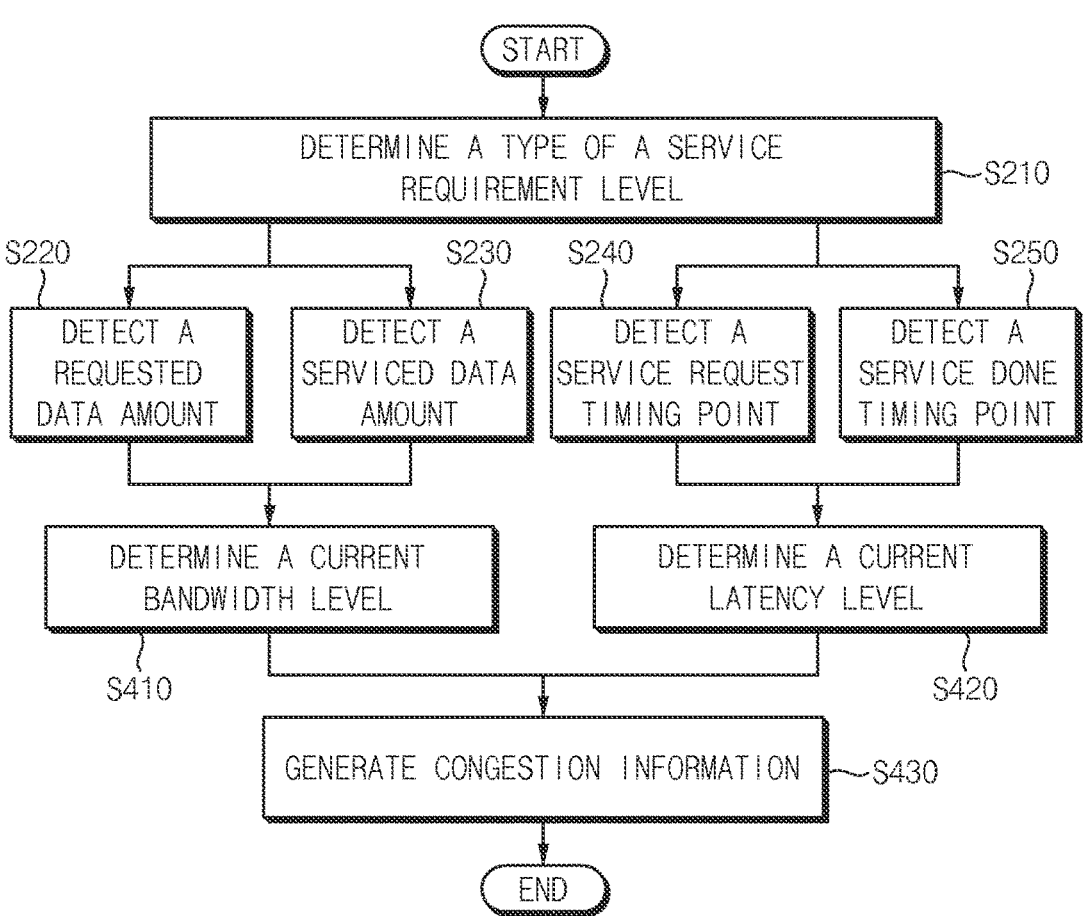

FIG. 14 is a flowchart illustrating a method of generating congestion information signals according to example embodiments.

Figure 15:
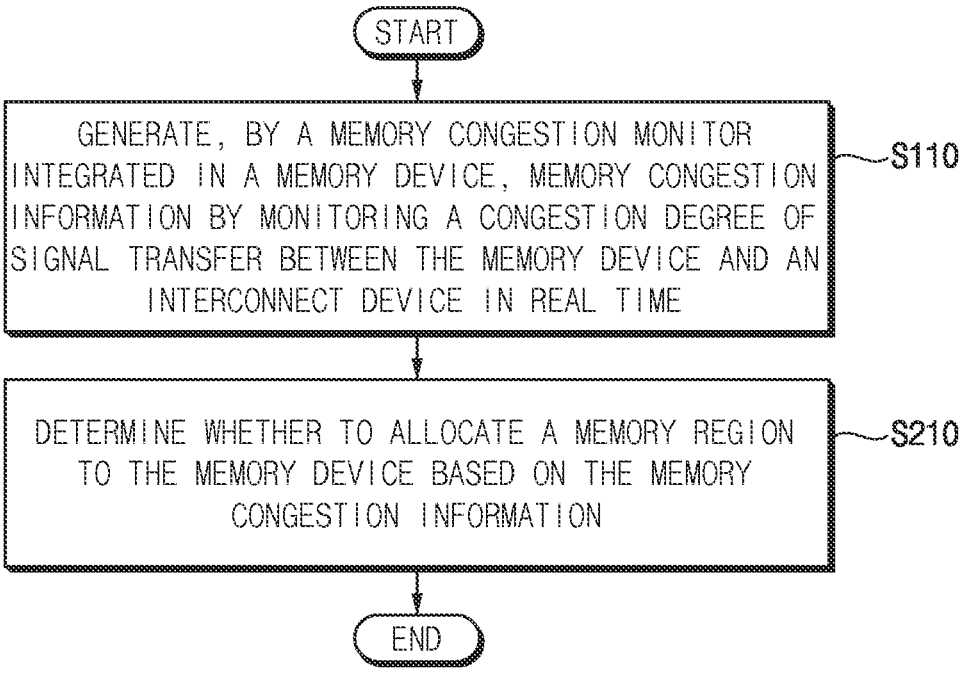

FIG. 15 is a flowchart illustrating a method of controlling operations of a computing system according to example embodiments.

Figure 16:
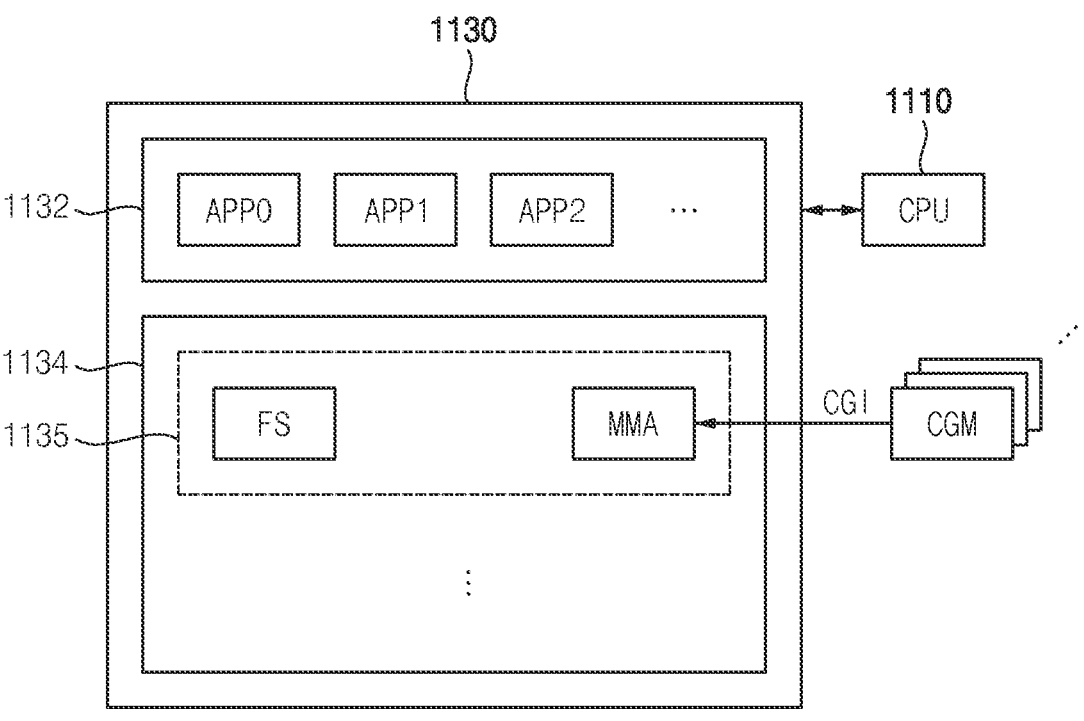

FIG. 16 is a diagram illustrating an example embodiment of a software structure of a computing system according to example embodiments.

Figure 17A:
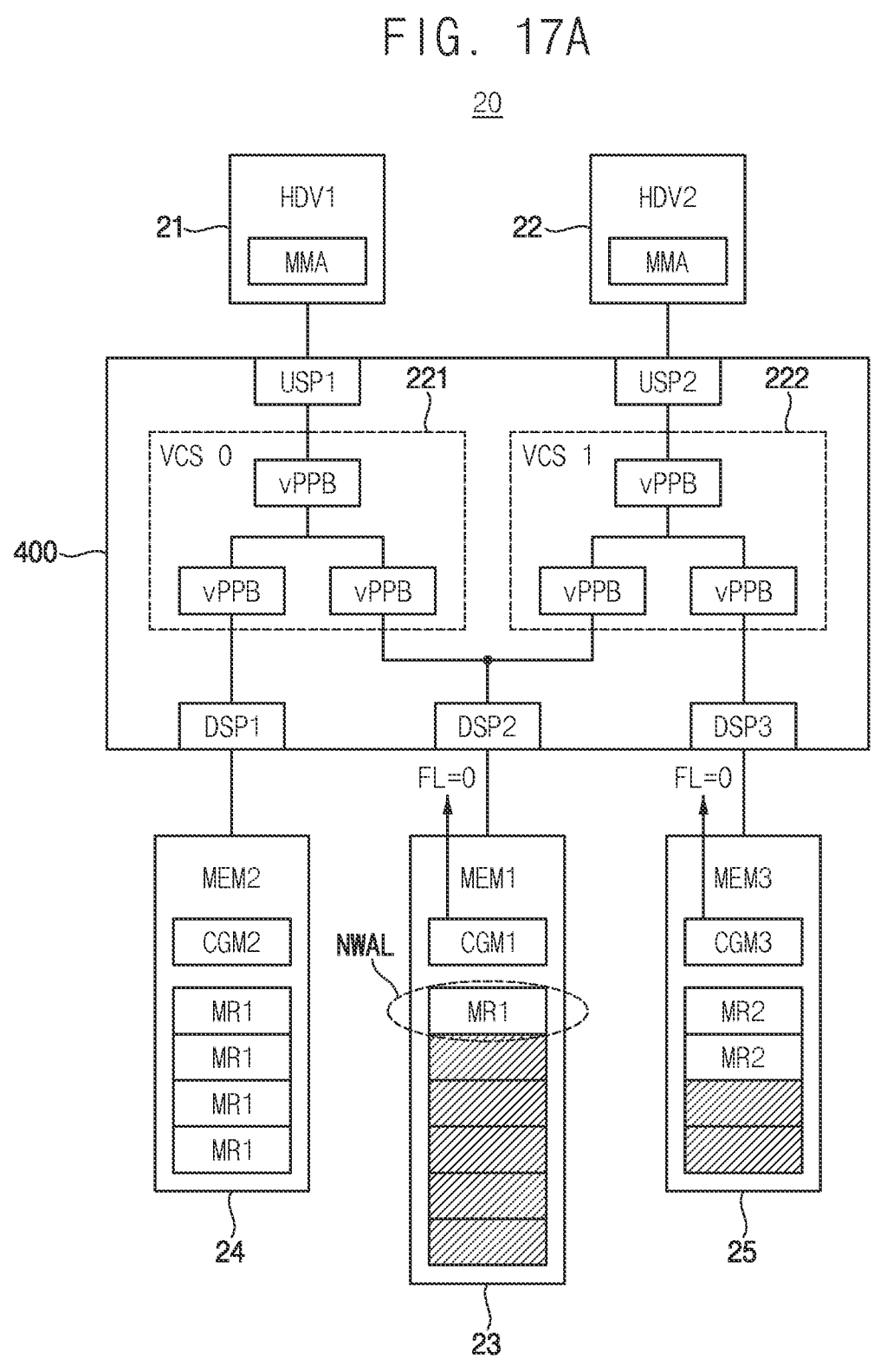
Figure 17B:
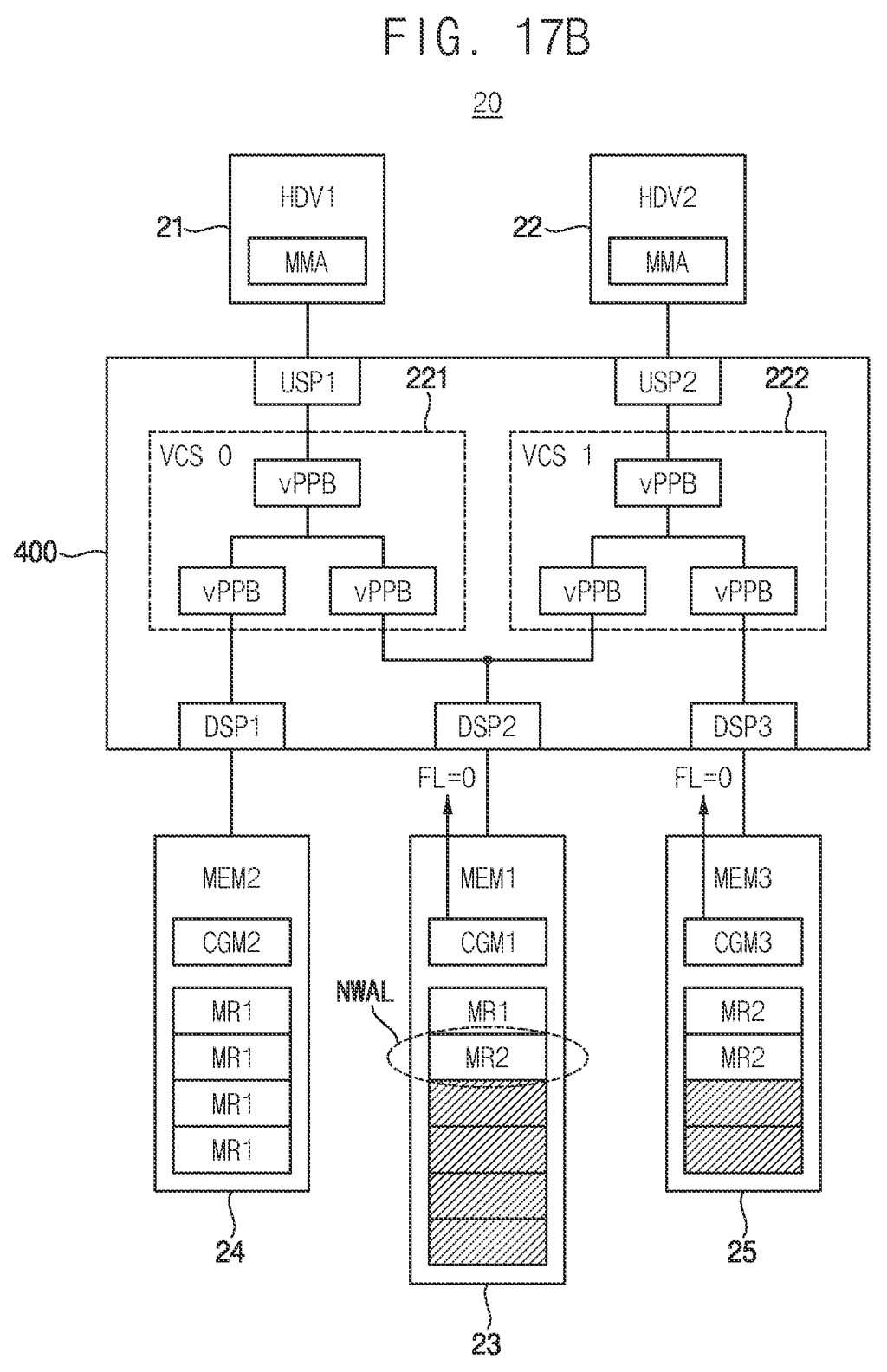
Figure 17C:
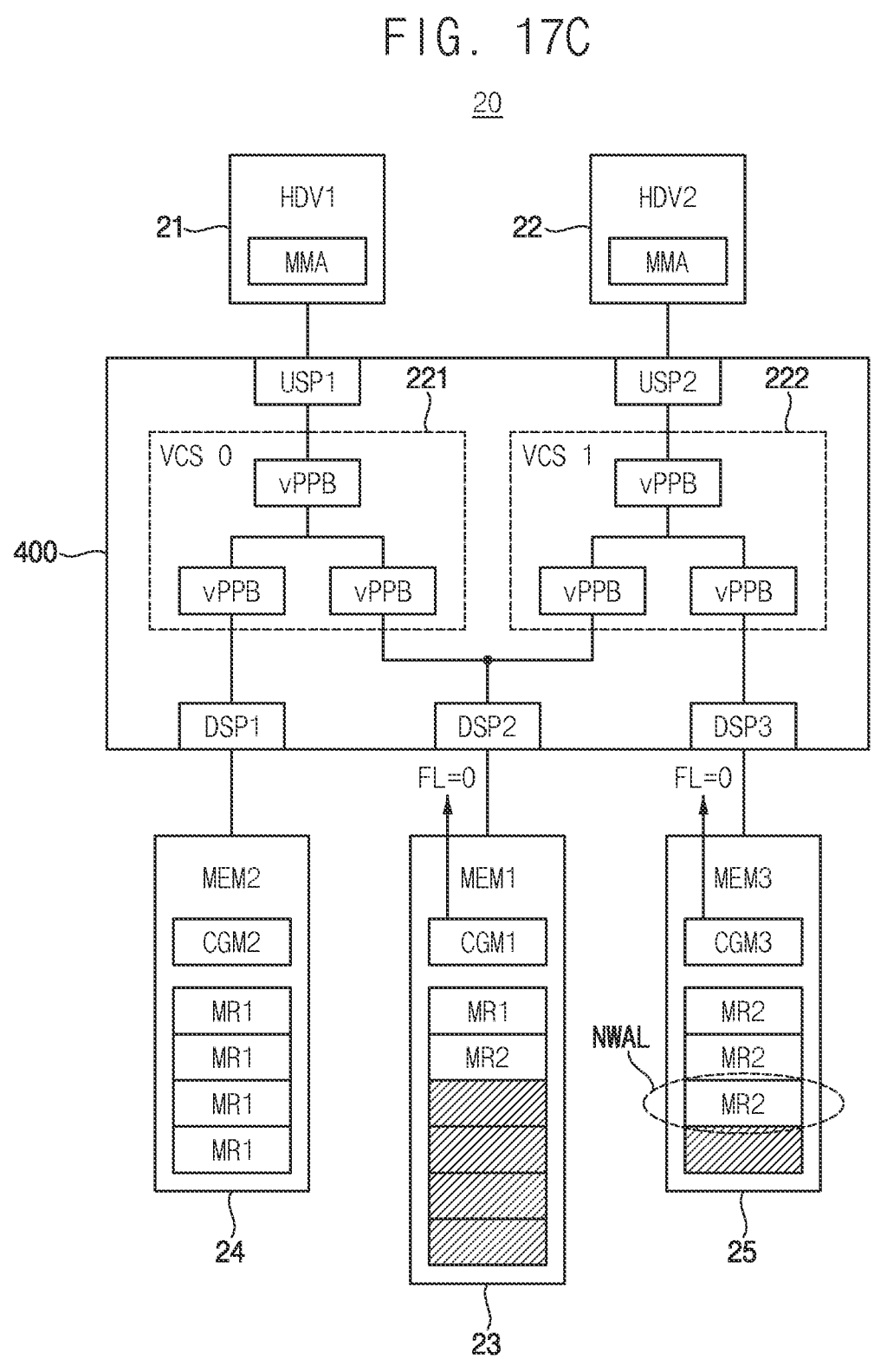

FIGS. 17A, 17B and 17C are diagrams for describing the method of FIG. 15.

Figure 18:
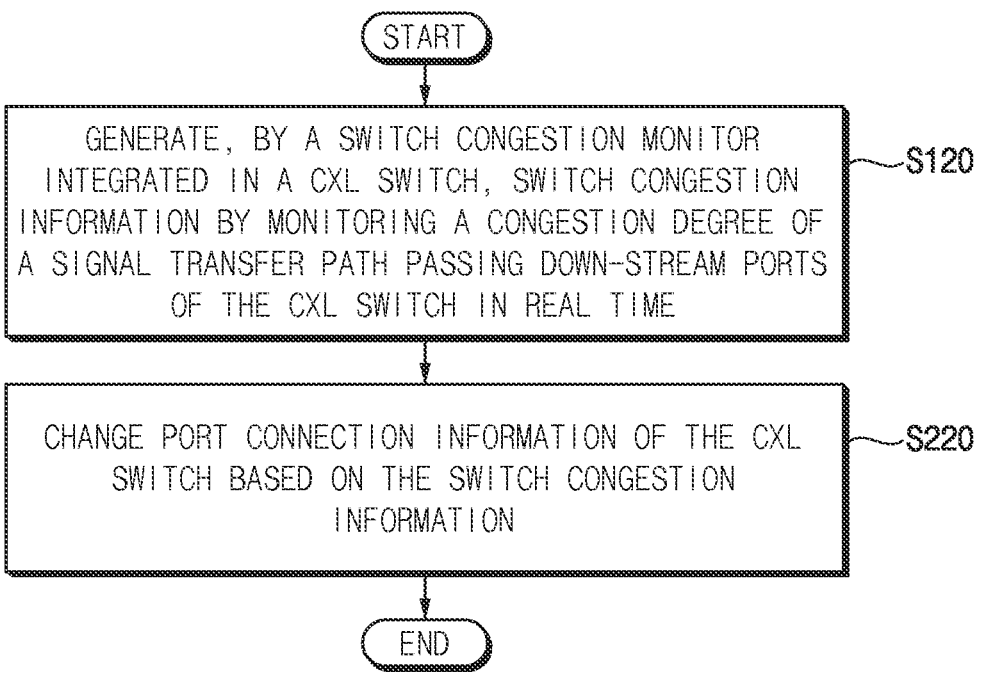

FIG. 18 is a flowchart illustrating a method of controlling operations of a computing system according to example embodiments.

Figure 19:
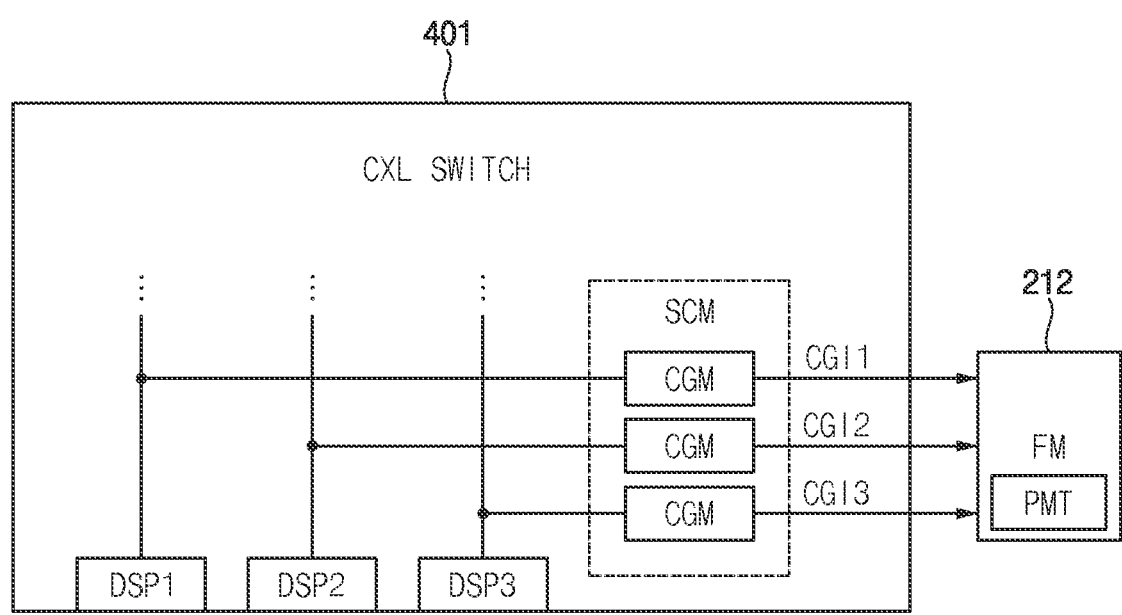

FIG. 19 is a block diagram illustrating an example embodiment of a compute express link (CXL) switch included in a computing system according to example embodiments.

Figure 20A:
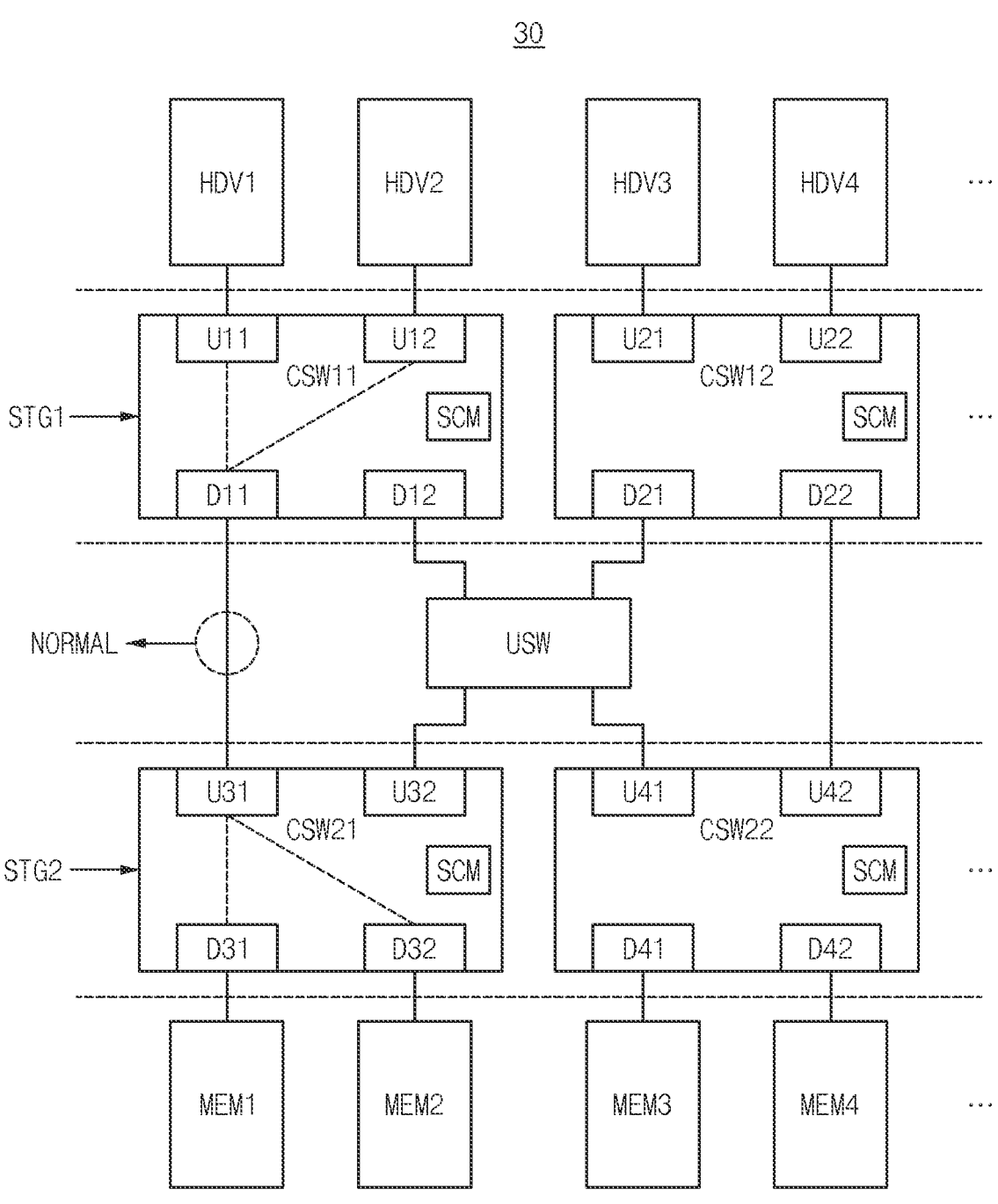
Figure 20B:
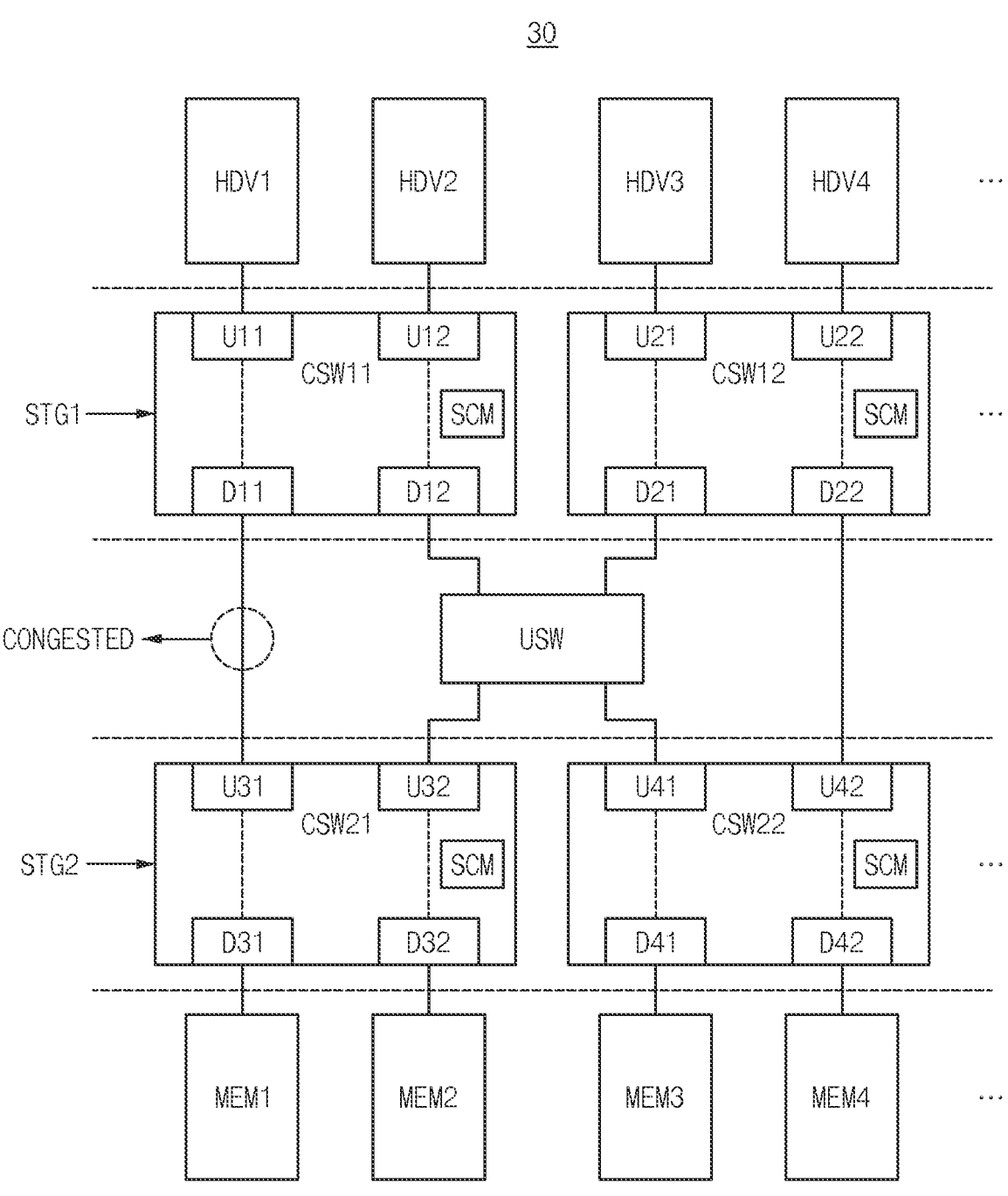

FIGS. 20A and 20B are diagrams for describing the method of FIG. 18.

Figure 21:
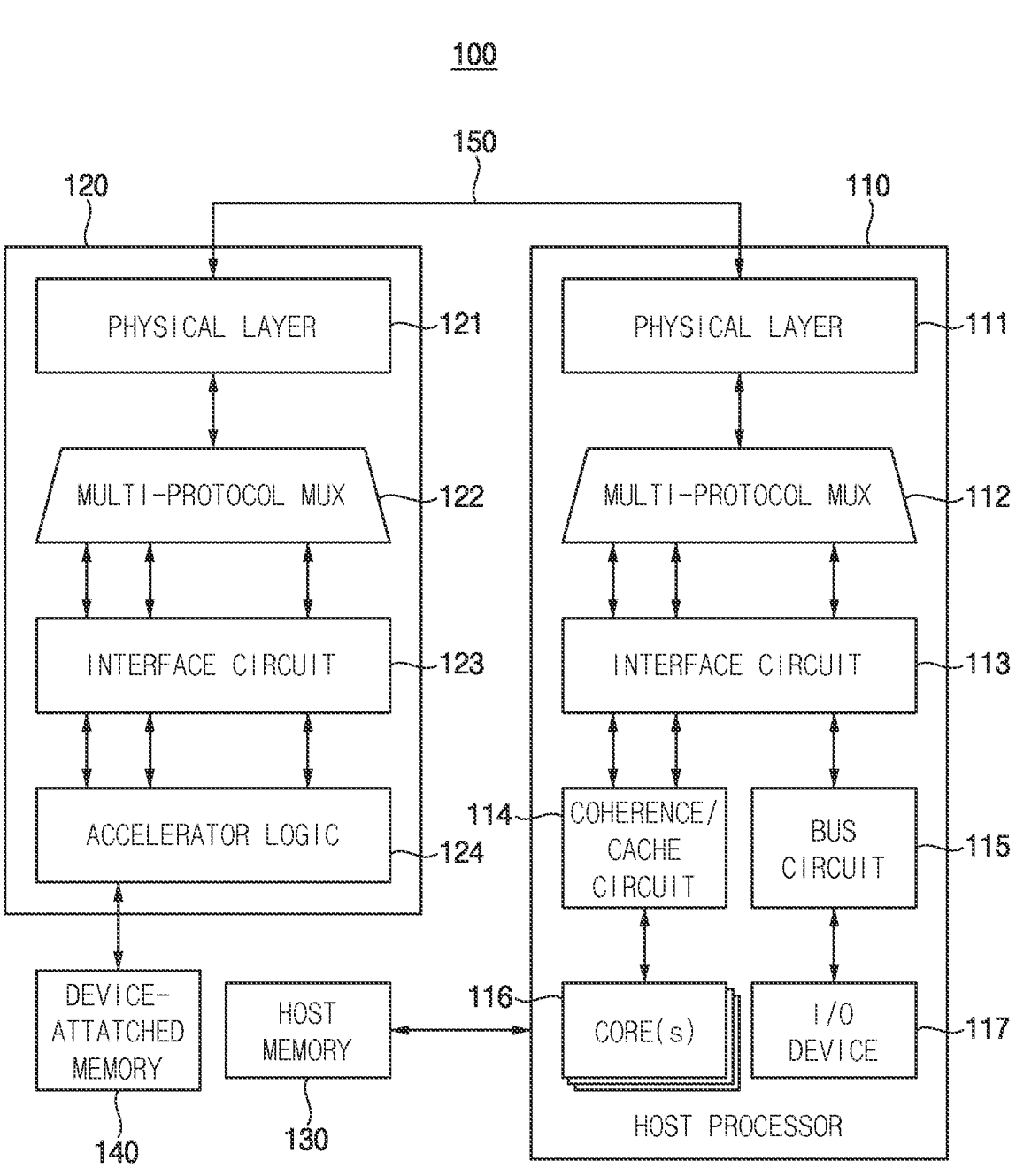
Figure 22:
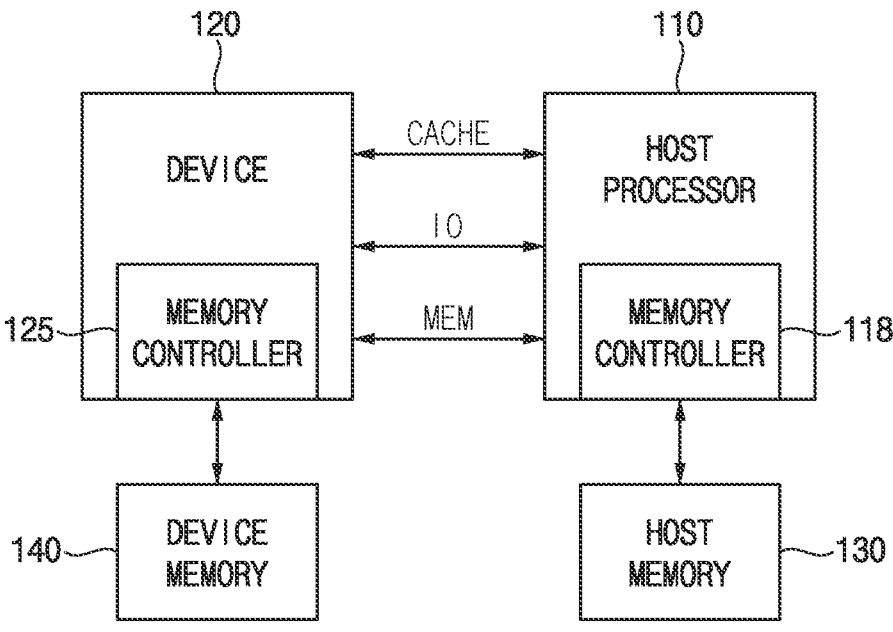

FIGS. 21 and 22 are diagrams illustrating example embodiments of a host device included in a computing system according to example embodiments.

Figure 23:
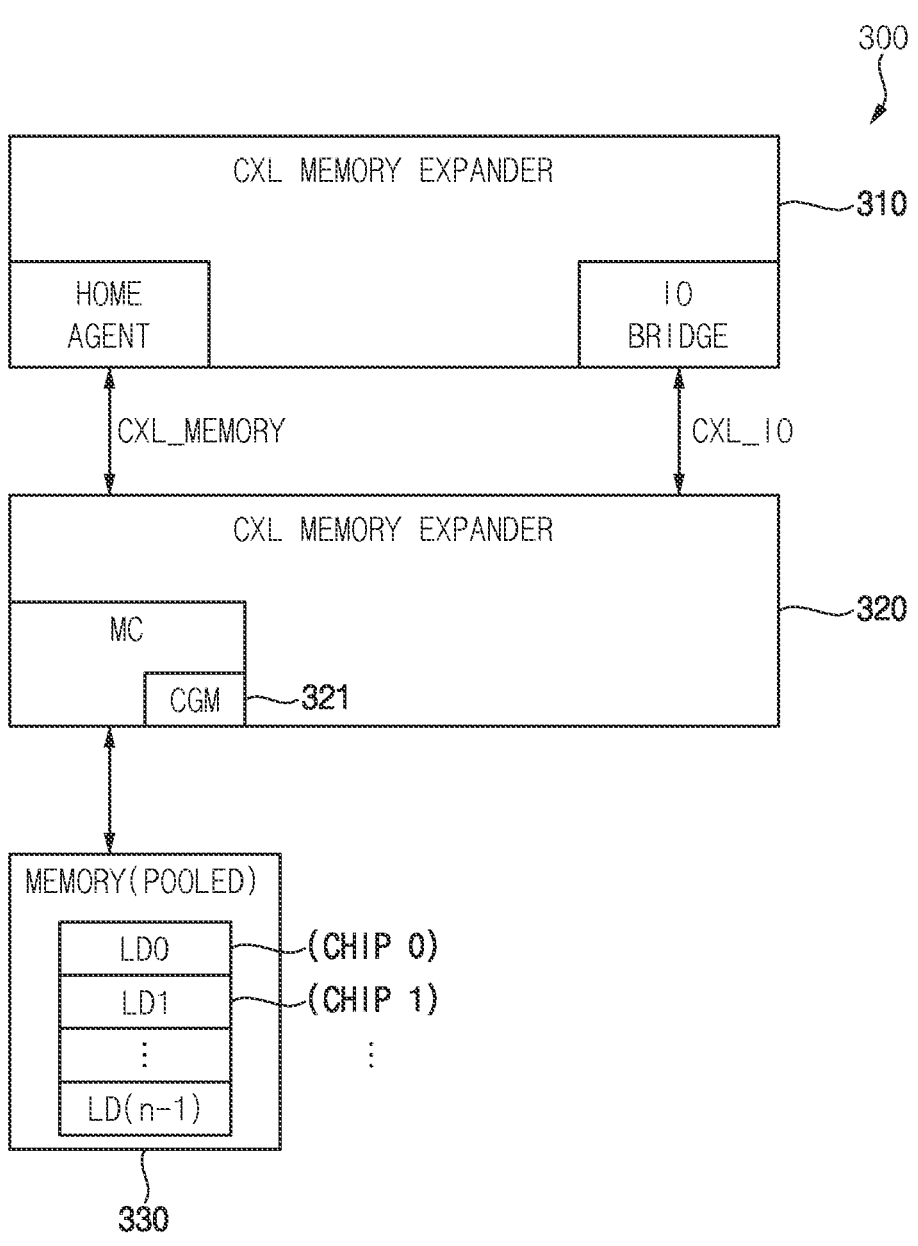

FIG. 23 is a diagram illustrating a computing system including a CXL-based Type 3 memory device according to example embodiments.

Figure 24:
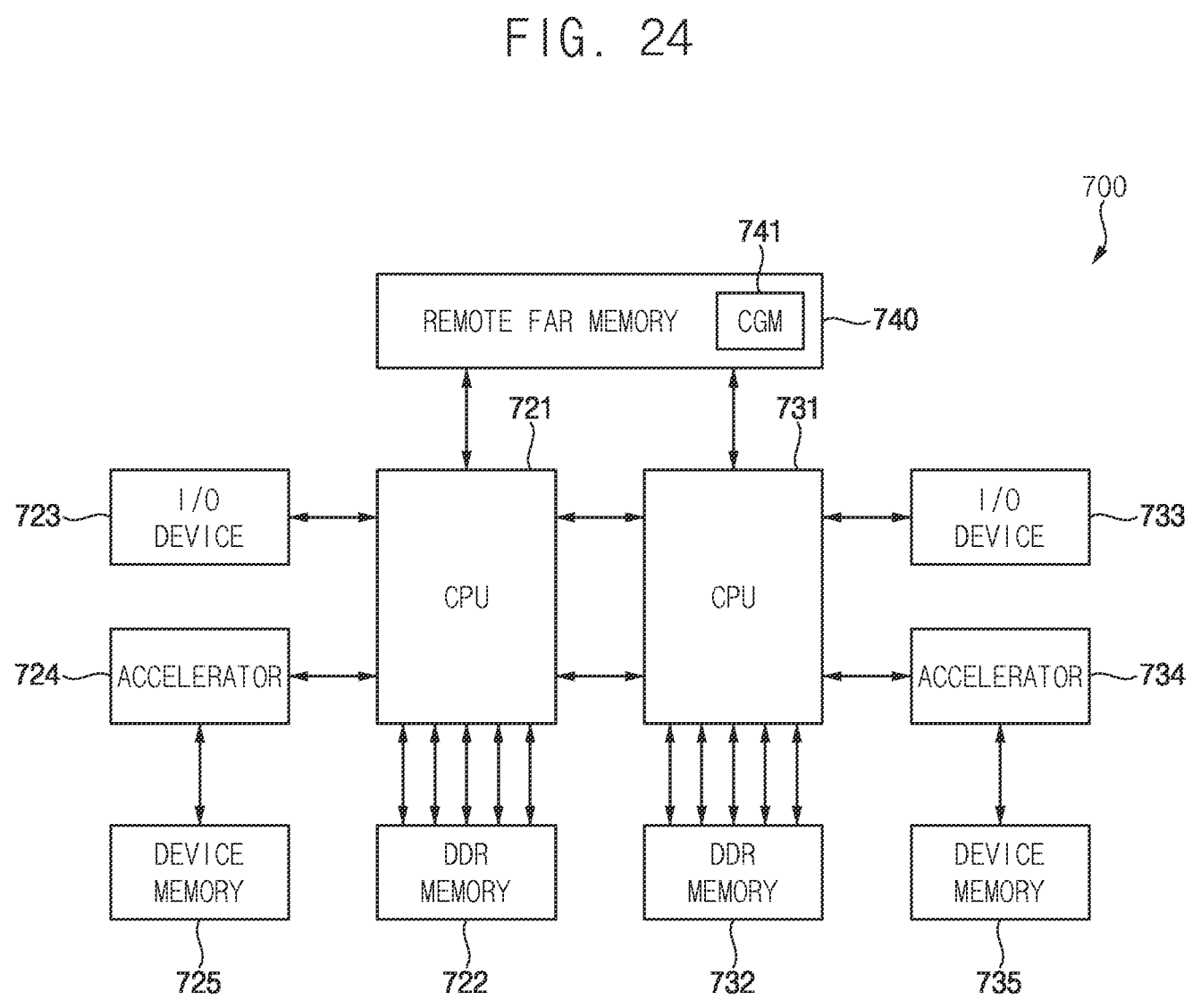

FIG. 24 is a block diagram illustrating a computing system according to example embodiments.

Figure 25:
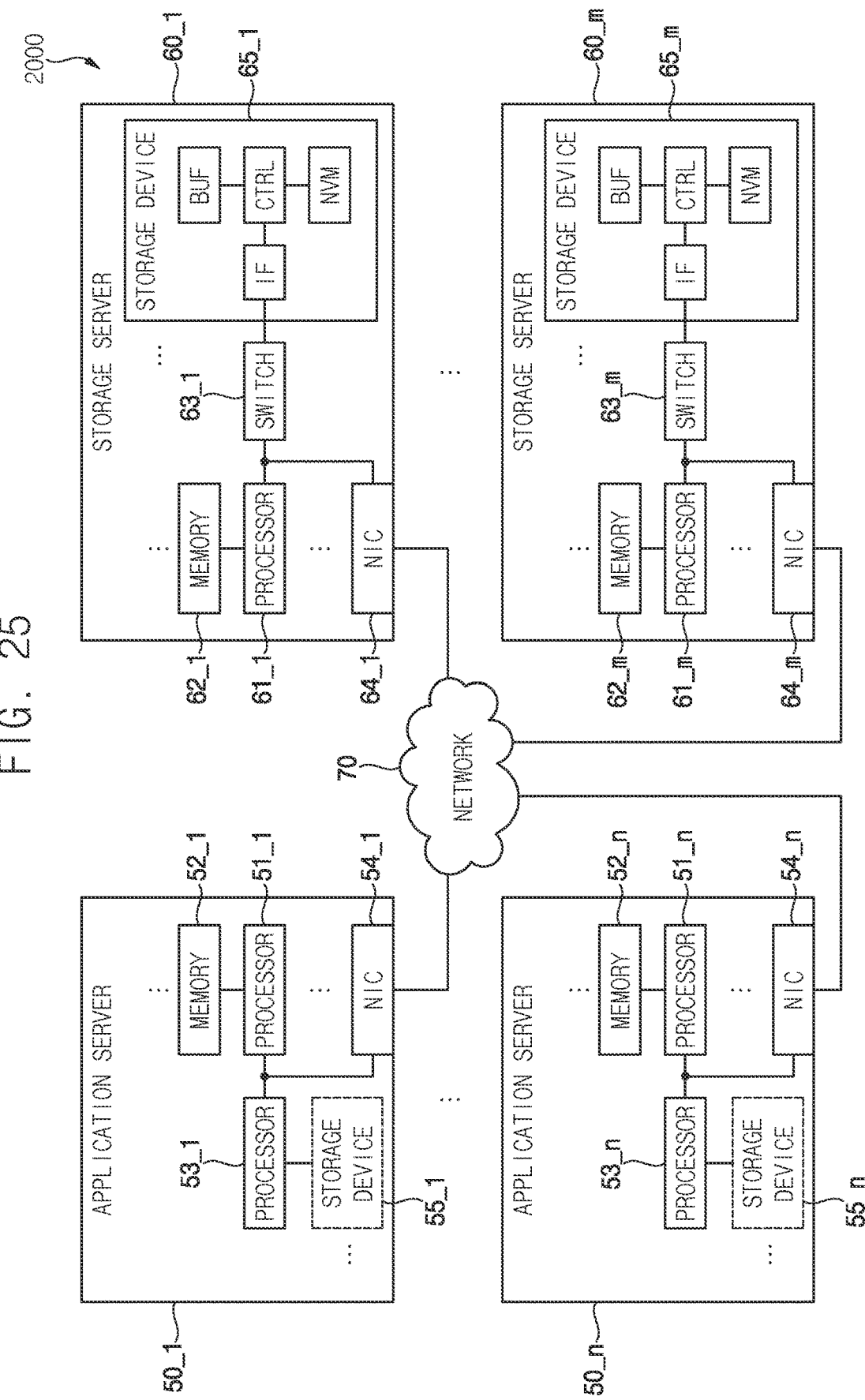

FIG. 25 is a block diagram illustrating a data center including a computing system according to example embodiments.

DETAILED DESCRIPTION OF THE EMBODIMENTS

Various example embodiments will be described more fully hereinafter with reference to the accompanying drawings, in which some example embodiments are shown. In the drawings, like numerals refer to like elements throughout; and repeated descriptions of elements may be omitted.

Figure 1:
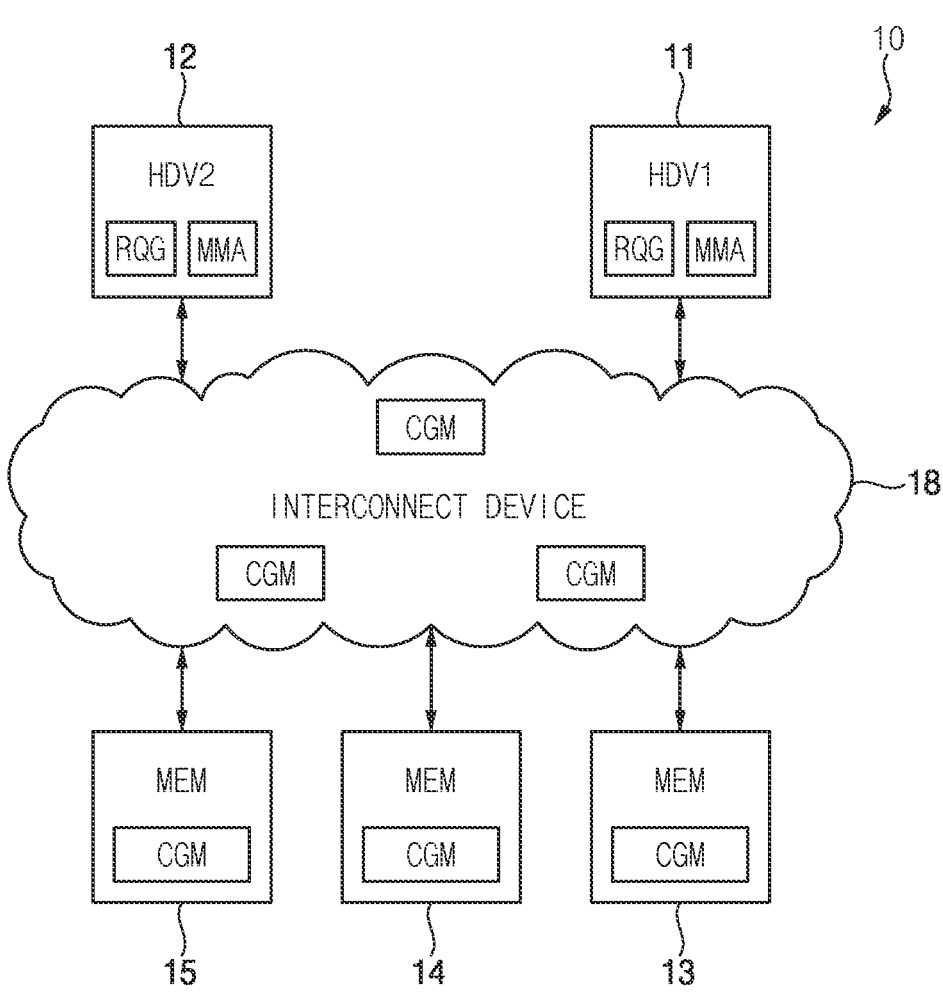
FIG. 1 is block diagram illustrating a computing system according to example embodiments.

FIG. 1 is block diagram illustrating a computing system 10 according to example embodiments, which may be variously referred to as a data processing system or the like, and may include one or more devices. Hereinafter, the computing system 10 may be simply referred to as a system. As an example embodiment, the system 10 may include one or more memory devices and host devices that generate requests to request access (e.g., read data or write data) to the memory devices. Since devices requesting data access operate as hosts for memory devices, the devices may be referred to as host devices or master devices. Meanwhile, memory devices may be referred to as slave devices in terms of providing services such as provision or storage of data to the host devices.

For example, the system 10 may include first, second and third memory devices (MEMs) 13, 14 and 15 together with a first host device (HDV1) 11 and a second host device (HDV2) 12. Although the system 10 including two host devices and three memory devices is illustrated in FIG. 1, example embodiments are not limited thereto and various numbers of devices may be included in the system 10.

Each of the first, second and third memory devices 13, 14 and 15 may include various types of memory, and as an example, each memory device may include a solid state drive (SSD), flash memory, and magnetic RAM (MRAM), ferroelectric RAM (FRAM), phase change RAM (PRAM) and resistive RAM (RRAM). However, example embodiments need not be limited to this, and each of the first, second third memory devices 13, 14 and 15 may include DDR SDRAM (Double Data Rate Synchronous Dynamic Random Access Memory), LPDDR (Low Power Double Data Rate), and dynamic random access memory (DRAM) such as SDRAM, graphics double data rate (GDDR) SDRAM, and Rambus Dynamic Random Access Memory (RDRAM).

The devices included in system 10 may communicate with each other through an interconnect device (or link) 18 that supports one or more protocols. Each of the devices may include internal components that perform protocol-based communication supported by the interconnect device 18. As an example, the protocol may include PCIe (Peripheral Component Interconnect Express) protocol, CXL (compute express link) protocol, XBus protocol, NVLink protocol, Infinity Fabric protocol, cache coherent interconnect for accelerators (CCIX) protocol, coherent accelerator processor interface (CAPI). At least one selected protocol may be applied to the interconnect device 18. Hereinafter, example embodiments will be described mainly based on communication based on the CXL protocol, but various other protocols may be applied in addition to the above protocols without being limited thereto.

Although the interconnect device 18 between the first host device 11, the second host device 12, and the first, second and third memory devices 13, 14 and 15 is briefly illustrated for convenience of description and illustration, the system 10 may include a root complex connected to a plurality of devices through root ports, such that the first host device 11, the second host device 12, and the first, second and third memory devices 13, 14 and 15 may communicate through the root complex. For example, the root complex may manage transactions between the first and second host devices 11 and 12 and the first, second and third memory devices 13, 14 and 15. In addition, in some example embodiments, mutual communication may be performed based on various other configurations and functions according to the CXL standard, and as an example, configurations such as a flex bus and a switch disclosed in the CXL standard. Also, at least some of the first, second and third memory devices 13, 14 and 15 may be connected to the first host device 11 and/or the second host device 12, through a predetermined protocol-based bridge (e.g., PCI bridge) that controls a communication path.

According to embodiments, each of the first host device 11 and the second host device 12 may include various types of devices. For example, each of the first host device 11 and the second host device 12 is a main processor and controls a central processing unit (CPU), graphic processing unit (GPU), or NPU (A programmable component such as a neural processing unit, a component providing fixed functions such as an intellectual property (IP) core, and a reconfigurable component such as a field programmable gate array (FPGA), and peripheral devices such as network interface cards (NICs).

According to example embodiments, at least one of the first, second and third memory devices 13, 14 and 15 may be shared by the first host device 11 and the second host device 12. For example, as will be described below with reference to FIGS. 3 and 4, at least one memory device may be a pooled memory shared by the first host device 11 and the second host device 12 and commands executed by the first host device 11 and the second host device 12 may be stored, data input to calculation processing, and/or processing results may be stored.

The first host device 11 and the second host device 12 may include a request generator RQG and a memory allocator MMA, respectively. The memory allocator MMA allocates a memory region that is exclusively accessed by a host device to prevent memory collisions caused by different host devices and to maintain consistency of data stored in the memory. The request generator RQG may generate requests for requesting a memory access such as a write operation and a read operation based on an address corresponding to the memory region exclusively allocated to each host device.

According to example embodiments, the computing system 10 may include a plurality of congestion monitors CMG. In some example embodiments, as will be described below with reference to 5, 15 through 17C, the congestion monitor CGM may include a memory congestion monitor included in the memory device. In other example embodiments, as will be described below with reference to FIGS. 18 through 20B, the congestion monitor CGM may include a switch congestion monitor included in a switch of the interconnect device 18.

FIG. 2 is a flowchart illustrating a method of controlling operations of a computing system according to example embodiments. The method of FIG. 2 may be applied to the computing system 10 as described with reference to FIG. 1 including the plurality of host devices 11 and 12 and the plurality of memory devices 13, 14 and 15 that communicate through the interconnect device 18. Referring to FIGS. 1 and 2, by the plurality of congestion monitors CGM, congestion information may be generated by monitoring a congestion degree of signal transfers with respect to at least one of the plurality of memory devices 13, 14 and 15 and the interconnect device 18 in real time (S100). According to some embodiments, at least one of a memory region allocation of the plurality of host devices 11 and 12 to the plurality of memory devices 13, 14 and 15 and a signal transfer path inside the interconnect device 18 may be controlled based on the congestion information (S200).

In some additional embodiments, as will be described below with reference to FIGS. 5, 15 through 17C, the memory region allocation of the plurality of host devices 11 and 12 to the plurality of the memory devices 13, 14 and 15 may be controlled based on memory congestion information provided from the memory congestion monitors CGM included in the plurality of memory devices 13, 14 and 15. In some further embodiments, as will be described below with reference to FIGS. 18 through 20B, the signal transfer path inside the interconnect device 18 may be controlled based on switch congestion information provided from the switch congestion monitors CGM included in the interconnect device 18.

Figure 3:
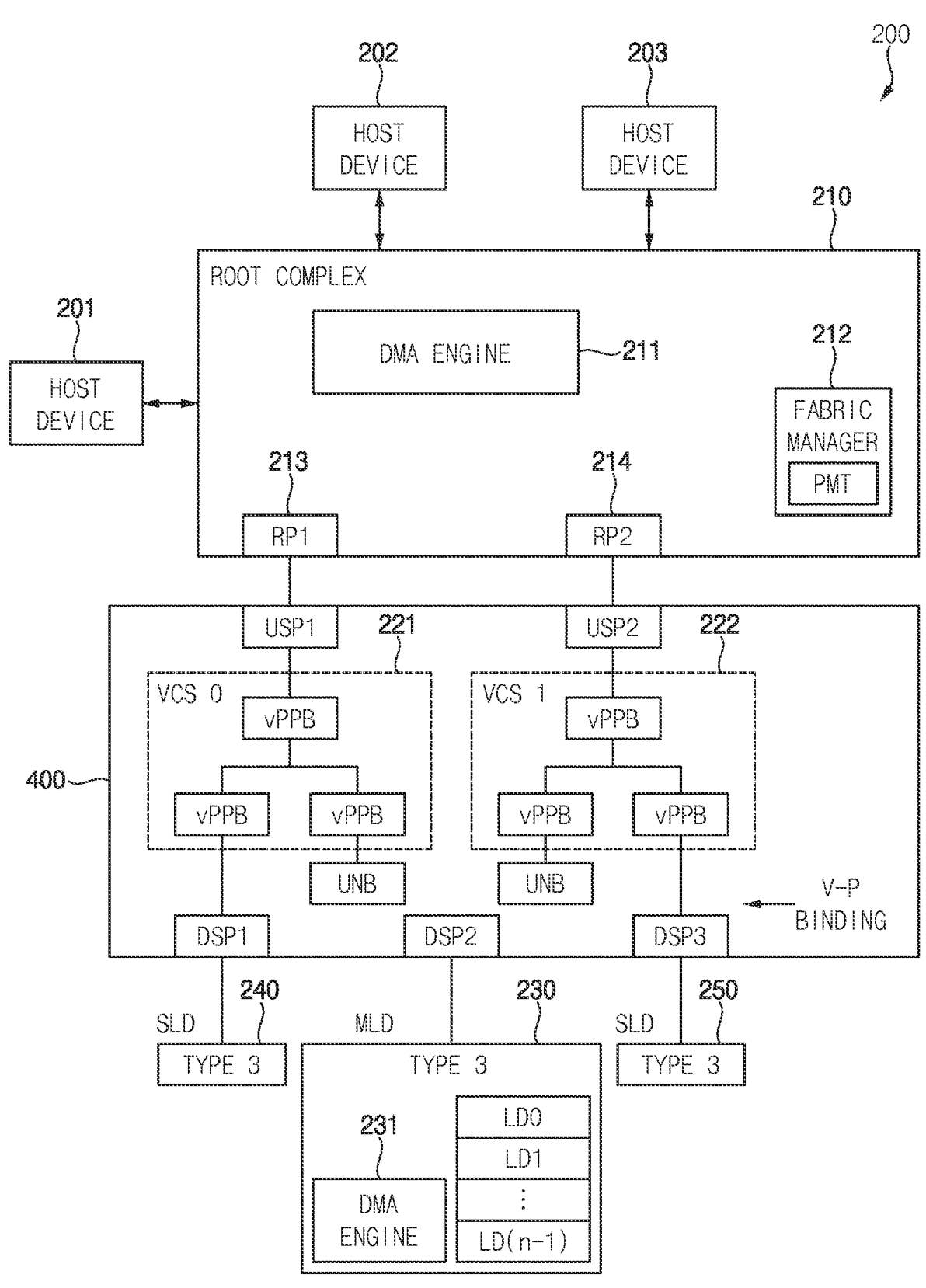
FIGS. 3 and 4 are block diagrams illustrating a computing system adopting a Compute Express Link (CXL) protocol according to example embodiments.
Figure 4:
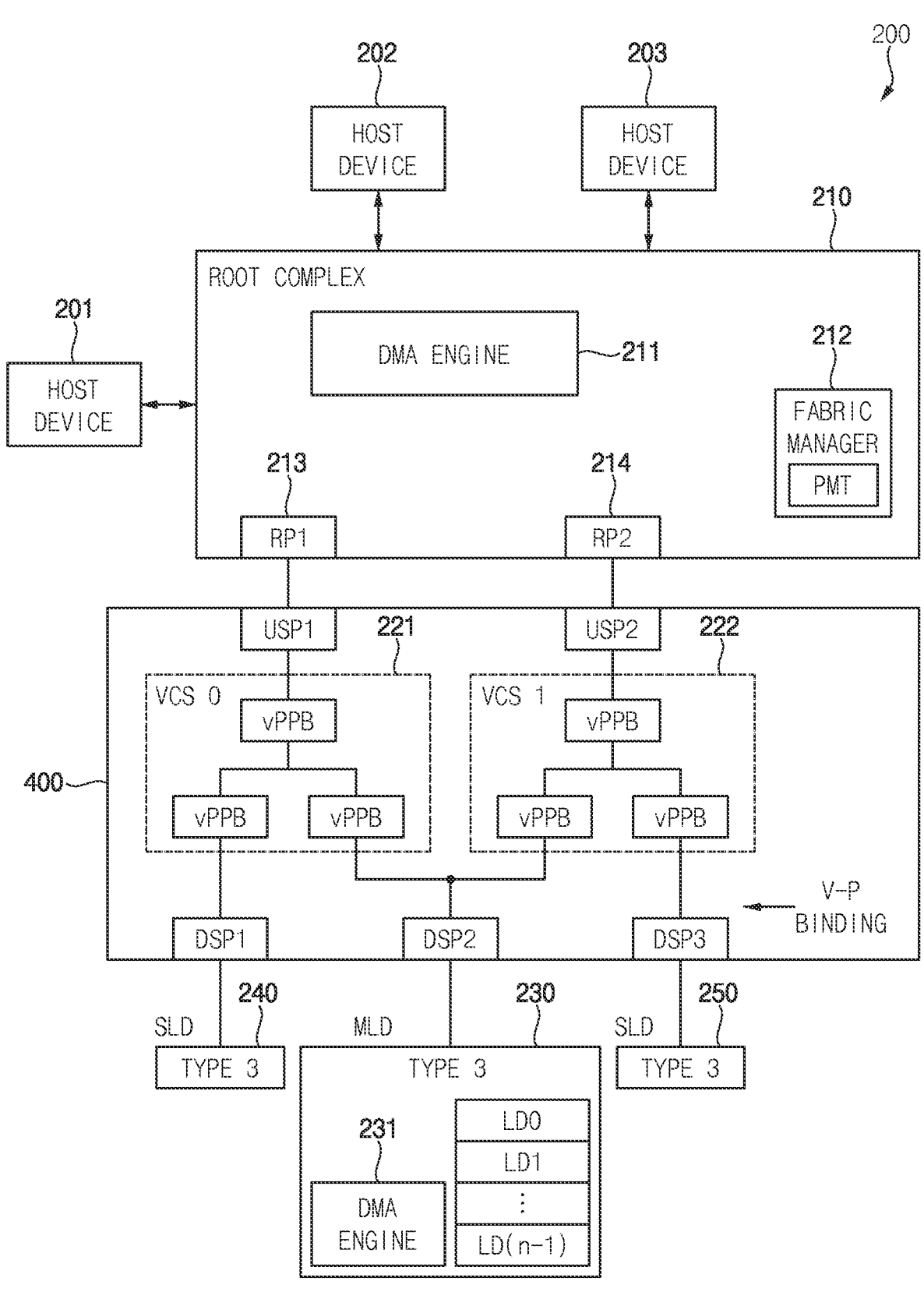

FIGS. 3 and 4 are block diagrams illustrating a computing system adopting a Compute Express Link (CXL) protocol according to example embodiments. A plurality of host devices 201 to 203 shown in FIGS. 3 and 4 may include various types of devices such as CPU, GPU, NPU, FPGA, and peripheral devices.

A system 200 may include a root complex 210 and host devices 201-203; the root complex 210 may include a DMA engine 211 and one or more root ports, such as first and second root ports RP1 213 and RP2 214 connected to a memory device. According to example embodiments, the root complex 210 may further include a fabric manager 212 that transfer data or requests through a fabric such as Ethernet, and may be connected to endpoints through the fabric. FIGS. 3 and 4 show examples in which the fabric manager 212 is included in the root complex 210, but is not limited thereto. According to example embodiments, the fabric manager 212 may be included in a CXL switch 400. In an example embodiment, the fabric manager 212 may be implemented in the form of firmware. As an example, the endpoint may include flash-based memory such as SSD and UFS, volatile memory such as DRAM and SDRAM (Synchronous DRAM), and nonvolatile memory such as PRAM, MRAM, RRAM, and FRAM. In FIGS. 3 and 4, the root complex 210 is shown as a component that is separate from the host device, but the root complex 210 may be implemented in an integrated form in each of the host devices 201, 202 and 203, according to some embodiments.

The root complex 210 may provide data communication based on various types of protocols between the host devices 201, 202 and 203 and first, second third memory devices 230, 240 and 250. In some example embodiments, the root complex 210 and the first, second and third memory devices 230, 240 and 250 may perform an interface including various protocols defined in CXL, for example, an I/O protocol (CXL.io).

Meanwhile, each of the first to third memory devices 230 to 250 may correspond to a Type 3 device defined in the CXL protocol. Accordingly, each of the first to third memory devices 230 to 250 may include a memory expander and the memory expander may include a controller. In some example embodiments, a memory device including a plurality of memory regions and a memory expander may be implemented as separate devices.

FIGS. 3 and 4 show one CXL switch 400 according to the CXL standard. The interconnect device 18 of FIG. 1 may include one or more CXL switches depending on its configuration. Each CXL switch 400 may include one or more upstream ports USP1 and USP2 and one or more downstream ports DSP1, DSP2 and DSP3. According to example embodiments, the system 200 may support multiple virtual channels. A virtual channel may provide multiple transport paths that are logically separated within one physical interface. In the example embodiments of FIGS. 3 and 4, the first virtual channel 221 corresponding to the first root port 213 and the second virtual channel 222 corresponding to the second root port 214 are exemplified, but the virtual channels of the system 200 may be implemented in various other forms. In addition, components of the host devices 201, 202 and 203, the root complex 210, and virtual channels may be considered as constituting a host system.

A single root port may be connected to multiple different devices through a virtual channel, or two or more root ports may be connected to a single device. For example, the first root port 213 may be connected to the second memory device 240 through a path including one or more virtual PCI-to-PCI bridges (vPPBs), and also the first root port 213 may be connected to the first memory device 230 through another path including one or more vPPBs. Similarly, the second root port 214 may be connected to the first memory device 230 through one path including one or more vPPBs and connected to the third memory device 250 through another path including one or more vPPBs.

The system 200 may provide a multi-logical device (MLD) supported by the CXL protocol. In an example embodiment, in the structure of the system 200 shown in FIGS. 3 and 4, the first memory device 230 is configured to communicate with two or more host devices through the first and second root ports 213 and 214, and is configured to include first to n-th memory regions LD0 to LD(n−1), which are allocated to different host devices. As an example, the first memory region LD0 may be allocated to the first host device 201 and may communicate with the first host device 201 through the first root port 213. Also, the second memory region LD1 may be allocated to the second host device 202 and may communicate with the second host device 202 through the second root port 214. Meanwhile, each of the second and third memory devices 240 and 250 may communicate through any one root port and may correspond to a single-logical device (SLD).

The first memory device 230 may include a DMA engine 231 and may be logically recognized as multiple devices. In an example operational example, data processing may be performed in which data stored in one logical device (e.g., memory region) may be copied to another logical device, and based on the control of the DMA engine 231, data read from any one memory region may be copied to another memory region without being output to the outside. That is, data transfer between a plurality of logical devices in the first memory device 230 may be performed by the DMA engine 231 in the first memory device 230 without moving data through a virtual channel and a root port. Through this, latency may be reduced and efficiency of interface bandwidth may be increased.

The fabric manager 212 may manage a port map table PMT including port connection information between upstream ports USP1 and USP2 and downstream ports DSP1, DSP2 and DSP3 included in each CXL switch 400. FIG. 3 shows a state in which some vPPBs are not connected to a physical port (UNB), and FIG. 4 shows a state in which the corresponding vPPBs are connected to a physical port, for example, the downstream port DSP2. Through virtual-physical connection (V-P BINDING) between the vPPBs and the downstream ports DSP1, DSP2 and DSP3, mapping between the upstream ports USP1 and USP2 and the downstream ports DSP1, DSP2 and DSP3 may be implemented, and as a result, the connection between devices connected to the physical port may be controlled. This virtual-physical connection (V-P BINDING) may be controlled by the fabric manager 212. The fabric manager 212 may manage the port map table (PMT) including the port connection information between the upstream ports USP1 and USP2 and the downstream ports DSP1, DSP2 and DSP3 included in each CXL switch 400. According to example embodiments, as will be described below with reference to FIGS. 18 through 20B, the fabric manager 212 may change the port connection information of each CXL switch based on the switch congestion information provided from each CXL switch.

Figure 5:
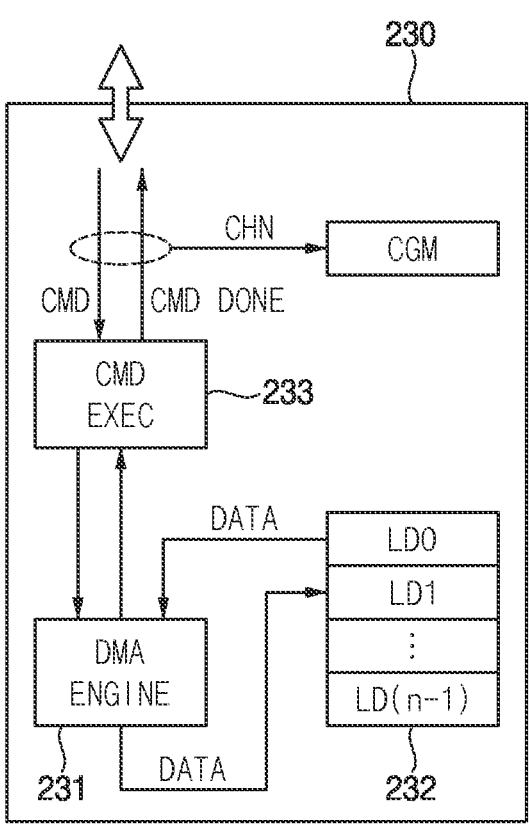
FIG. 5 is a block diagram illustrating an example embodiment of a memory device included in a computing system according to example embodiments.

FIG. 5 is a block diagram illustrating an example embodiment of a memory device included in a computing system according to example embodiments. In particular, as shown by FIG. 5, the first memory device 230 in FIGS. 3 and 4 may include a DMA engine 231, a memory 232, a command executor 233, and a memory congestion monitor CGM. The memory 232 may include a plurality of memory regions, for example, first to n-th memory regions LD0 to LD(n−1). Although the first memory device 230 is shown as one device in the example shown in FIG. 5, the memory 232 and the memory expander including the DMA engine 231 and the command executor 233 may be implemented as separate devices.

The first memory device 230 may include an interface circuit and may communicate with the outside based on a predetermined protocol. The command executor 233 receives a request including a command CMD from an external host device, performs data writing and data reading corresponding to the command CMD, and sends a response (CMD DONE) indicating that the command has been completed to the outside. Also, the command executor 233 may determine whether the request indicates copying of data between memory regions in the memory 232. The DMA engine 231 may control the transfer path of the data based on the control of the command executor 233, and as an example, the data read from the first memory region LD0 allocated to any one host device may be received and transferred to the second memory region LD1 allocated to another host device.

The memory congestion monitor CGM may generate the memory congestion information by monitoring the congestion degree of signal transfers between the first memory device 230 and the interconnect device (e.g., 18 of FIG. 1) in real time. In an example embodiment, the memory congestion monitor CGM may generate the memory congestion information based on channel signals CHN of a channel connecting the first memory device 230 and the interconnect device 18.

Figure 6:
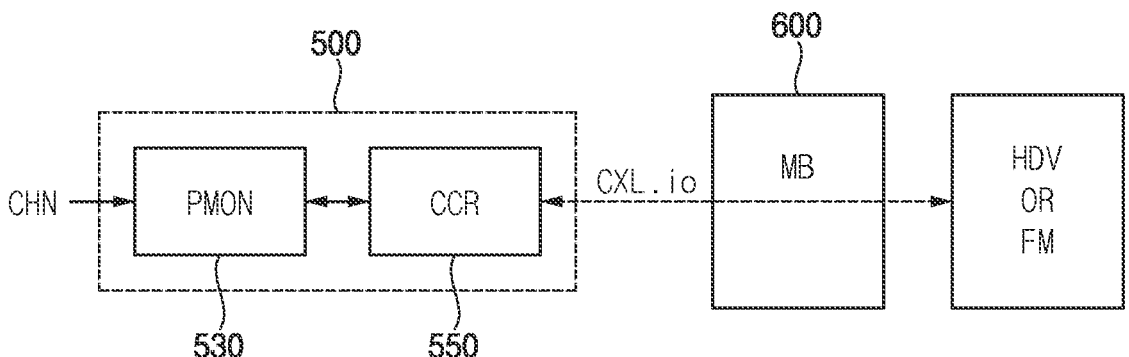
FIG. 6 is a diagram illustrating an example embodiment of a congestion monitor and a transfer of congestion information in a computing system according to example embodiments.

FIG. 6 is a diagram illustrating an example embodiment of a congestion monitor and a transfer of congestion information in a computing system according to example embodiments. Referring to FIG. 6, a congestion monitor 500 may include a performance monitor (PMON) 530 and a control core (CCR) 550, in some embodiments. The performance monitor 530 may detect a congestion level of signal transfer in real time and generate a current congestion level. The control core 550 may generate congestion information based on the current congestion level. In an example embodiment, the performance monitor 530 may generate the current congestion level corresponding to bandwidth and/or latency based on the channel signals CHN. Example embodiments of the performance monitor 530 will be described hereinbelow with reference to FIGS. 7 through 13.

In some example embodiments, the congestion monitor 500 may communicate with a host device HDV or a fabric manager FM based on an input-output (I/O) protocol CXL.io according to the CXL protocol. The host device HDV may receive the memory congestion information from the memory congestion monitor 500 included in each memory device through a mailbox (MB) interface 600 defined in the CXL protocol. In an example embodiment, the mailbox interface 600 may be implemented in a manner in which a partial area of the host memory is registered as a mailbox register area for communication. In addition, the fabric manager FM may receive switch congestion information from the switch congestion monitor 500 by directly accessing the switch congestion monitor 500 or indirectly through the CXL protocol.

Figure 7:
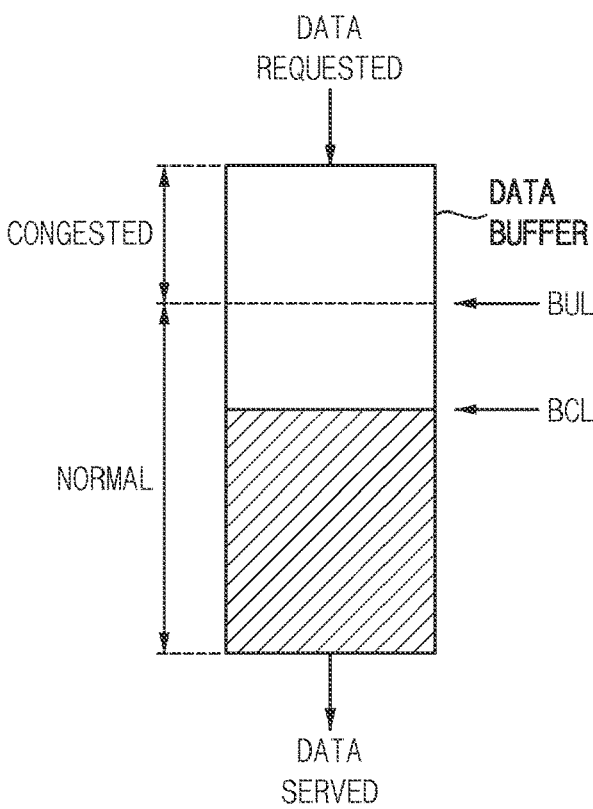
FIG. 7 is a diagram illustrating a buffer model for detecting a bandwidth in a computing system according to example embodiments.

FIG. 7 is a diagram illustrating a buffer model for detecting a bandwidth in a computing system according to example embodiments. According to operating characteristics of a host device or master device, a service requirement level of the host device may be expressed as a bandwidth. The bandwidth represents the amount of data transferred or serviced in a given period of time. For example, the host device may perform its own function while storing or reading data from a memory device connected through an interconnect device.

In FIG. 7, an occupancy state of a virtual data buffer of the memory device is indicated by hatched lines. The occupancy state of data may be expressed as a current bandwidth level BCL. The current bandwidth level BCL may increase when a request for data service (write or read) is received from the host device (DATA REQUESTED), and the current bandwidth level BCL may decrease when the memory device complete the data service (DATA SERVED). As the current bandwidth level BCL increases, the amount of data to be processed by the memory device may increase, and accordingly, the signal transfer congestion of the memory device may increase.

A reference value such as a bandwidth urgency level BUL may be determined according to an overall scenario of the system, and a congestion flag FL may be generated based on the reference value BUL and the current bandwidth level BCL. If the current bandwidth level BCL is lower than the bandwidth urgency level BCL, it corresponds to a normal state and the congestion flag FL may be inactivated (e.g., FL=0). In contrast, if the current bandwidth level BCL is higher than the bandwidth urgency level BUL, it corresponds to a congested state and the congestion flag FL may be activated (e.g., FL=1).

Figure 8:
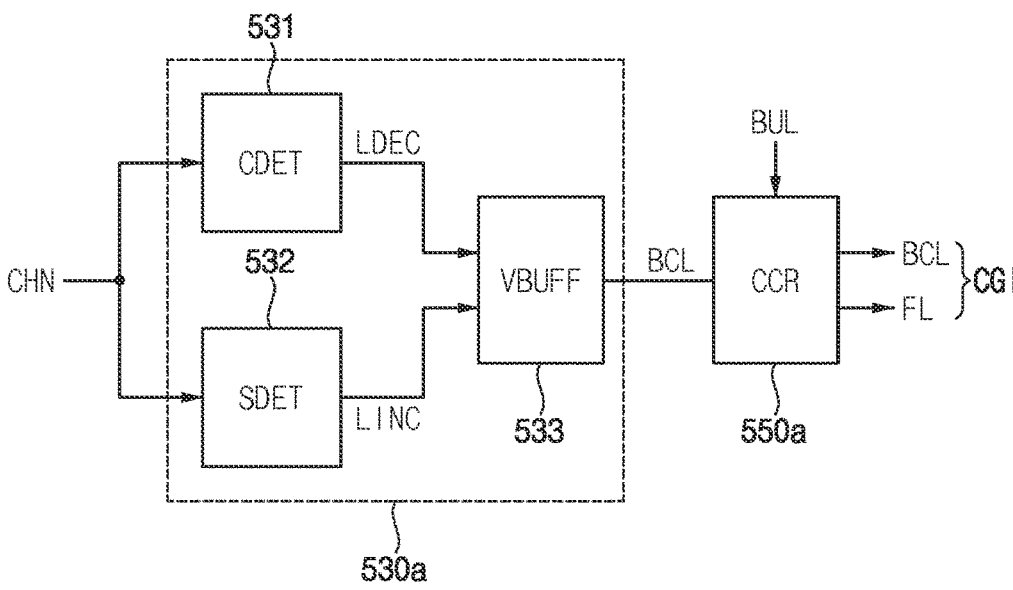
FIG. 8 is a block diagram illustrating an example embodiment of a congestion monitor using the buffer model of FIG. 7.

FIG. 8 is a block diagram illustrating an example embodiment of a congestion monitor using the buffer model of FIG. 7. Referring to FIG. 8, a congestion monitor 500a may include a bandwidth monitor 530a and a control core 550a. The bandwidth monitor 530a may detect the bandwidth of a corresponding channel in real time and generate a current bandwidth level BCL. The bandwidth monitor 530a may include a first data detector (DET1) 531, a second data detector (DET2) 532, and a virtual buffer (VBUFF) 533.

In an example embodiment, the first data detector 531 generates a level decrease signal LDEC based on channel signals CHN, and the second data detector 532 generates a level increase signal LINC based on the channel signals CHN. For example, the level decrease signal LDEC may be activated in a pulse form whenever a data service is completed, and the level increase signal LINC may be activated in a pulse form whenever a data service is requested.

The virtual buffer 533 generates the current bandwidth level BCL based on the level decrease signal LDEC and the level increase signal LINC. As described with reference to FIG. 7, the control core 550a may generate the congestion flag FL based on the reference value BUL and the current bandwidth level BCL. The aforementioned congestion information CGI may include the current bandwidth level BCL and/or the congestion flag FL.

The reference value such as the bandwidth urgency level BUL may be determined according to the overall scenario of the system. For example, the reference value BUL may be provided during system initialization and stored in the control core 550a. The control core 550a may be implemented with a special function register (SFR), a field programmable gate array (FPGA), or the like that is configured to perform a predetermined process sequence in response to stored values and input values.

Figure 9:
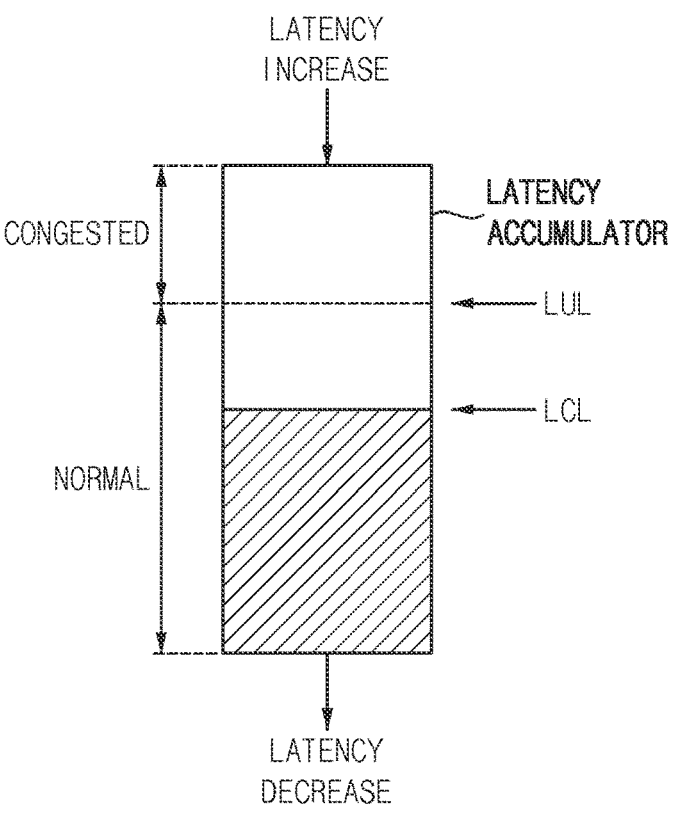
FIG. 9 is a diagram illustrating an accumulator model for detecting a latency in a computing system according to example embodiments.

FIG. 9 is a diagram illustrating an accumulator model for detecting a latency in a computing system according to example embodiments. According to operating characteristics of a host device or a master device, the required level of the host device may be expressed as a latency. As will be understood by those skilled in the art, the latency represents the time from when a host device (or master device) requests a service to a memory device (or slave device) until the requested service is completed.

FIG. 9 illustrates a latency accumulator in which a latency state of a memory device or a CXL switch is indicated by hatched lines. The latency state may be expressed as a current latency level LCL. The current bandwidth level LCL may increase when the latency increases, and the current latency level LCL may decrease when the latency decreases. As the current latency level LCL increases, the congestion degree of signal transfer of the memory device may increase.

A reference value such as a latency emergency level LUL may be determined according to an overall scenario of the system, and the above-described congestion flag FL may be generated based on the reference value LUL and the current latency level LCL. If the current latency level LCL is lower than the latency emergency level LCL, it corresponds to a normal state and the congestion flag FL may be deactivated (e.g., FL=0). However, if the current latency level LCL is higher than the latency emergency level LUL, it corresponds to a congested state and the congestion flag FL may be activated (e.g., FL=1).

FIG. 10 is a block diagram illustrating an example embodiment of a congestion monitor using the accumulator model of FIG. 9. Referring to FIG. 10, a congestion monitor 500b may include a latency monitor 530b and a control core 550b. The latency monitor 530b detects latency in real time based on the corresponding channel signals CHN and generates a current latency level LCL. The latency monitor 530b may include a subtractor (SUB) 535, an accumulator (ACC) 537 and a latency detector (LATDET) 540. The latency detector 540 may generate a current latency CLAT based on the channel signal CHN. The subtractor 535 may output a latency change value dLAT by calculating a difference between the current latency LCL and a reference latency RLAT. The accumulator 537 may accumulate the latency change value dLAT to generate the current latency level LCL.

As described with reference to FIG. 9, the control core 550b may generate the congestion flag FL based on the reference value LUL and the current latency level LCL. The aforementioned congestion information CGI may include the current bandwidth level BCL and/or the congestion flag FL. A reference value such as a latency emergency level LUL may be determined according to the overall scenario of the system. For example, the reference value LUL may be provided during an initialization process of the system and stored in the control core 550b. The control core 550b may be implemented with a special function register SFR, a field programmable gate array FPGA, or the like having a configuration that performs a predetermined process sequence in response to stored values and input values.

FIG. 11 is a block diagram illustrating an example embodiment of a latency detector included in the congestion monitor of FIG. 10. Referring to FIG. 11, a latency detector 540 may include a first flip-flop (FF1) 541, a second flip-flop (FF2) 542, a counter 543, a first latch (LATCH1) 544, a second latch (LATCH2) 545, a calculator 546, a first logic gate 548 and a second logic gate 549. For example, the first logic gate 548 may be implemented as an AND gate, and the first logic gate 548 may output the result of the AND operation on a request valid signal ARVALID and a request ready signal ARREADY. The output signal of the first logic gate 548 is input to the data terminal (D) of the first flip-flop 541, and a global clock signal ACLK is input to the clock terminal (C). The first flip-flop 541 samples the output signal of the first logic gate 548 in response to the rising edge of the global clock signal ACLK, and generates a signal SS1 synchronized with the rising edge of the global clock signal ACLK through the output terminal (Q).

For example, the second logic gate 549 may be implemented as an AND gate, and the second logic gate 549 may output the result of the AND operation on a service valid signal RVALID, a service ready signal RREADY, and a service done signal RLAST. The output signal of the second logic gate 549 is input to the data terminal (D) of the second flip-flop 542, and the global clock signal ACLK is input to the clock terminal (C). The second flip-flop 542 samples the output signal of the second logic gate 549 in response to the rising edge of the global clock signal ACLK, and generates a signal SS2 synchronized with the rising edge of the global clock signal ACLK through the output terminal (Q).

The counter 543 provides a count signal CNT by counting the number of cycles of the global clock signal ACLK. The first latch 544 latches the count signal CNT in response to the rising edge of the output signal SS1 of the first flip-flop 541 and provides a start count signal CNT1. Also, the first latch 544 receives the first identification signal ARID associated with the request signals ARVALID and ARREADY and provides a first identification code ID1.

The second latch 545 latches the count signal CNT in response to the rising edge of the output signal SS2 of the second flip-flop 542 and provides a completion count signal CNT2. Also, the second latch 545 receives the second identification signal BID associated with the service signals RVALID, RREADY and RLAST, and provides a second identification code ID2.

The calculator 546 generates the current latency CLAT based on the start count signal CNT1 and the completion count signal CNT2. When the system 1000 adopts a protocol supporting multiple outstanding transactions between a host device, an interconnect device and a memory device, the identification signals (ARID, BID) may be used to distinguish the request signals ARVALID and ARREADY and the service signals RVALID, RREADY and RLAST corresponding to the same transaction.

The calculator 546 updates a mapping table 547 whenever the first count signal CNT1 and the first identification code ID1 are input, to store the values ID11, ID12 and ID13 of the first identification code ID1 and corresponding values C1, C2 and C3 of the first count signal CNT1. When the second count signal CNT2 and the second identification code ID2 are input, the calculator 546 extracts a count value C1, C2 or C3 indicating the request time point corresponding to the second count signal CNT2 from the mapping table 547. In some embodiments, the calculator 546 may generate the current latency CLAT by calculating a difference between the count value, which indicates the request completion time of the input second count signal CNT2, and the extracted count value.

FIG. 12 is a timing diagram illustrating an exemplary transaction performed by a computing system according to example embodiments and an exemplary current latency detected by the latency detector of FIG. 11. FIG. 12 illustrates an example of a read transaction according to an advanced extensible interface (AXI) protocol for convenience of description. The AXI protocol adopts a handshake mechanism using valid signals ARVALID and RVALID and ready signals ARREADY and RREADY.

According to the handshake scheme, one side of the master interface and the slave interface activates a valid signal when a signal is transmitted, and the other side activates a ready signal when ready for reception. Sampling of the signal transfer is performed in synchronization with the rising edge of the global clock signal ACLK on both the master interface and the slave interface. Accordingly, the valid signal transfer is performed only when both the valid signal and the corresponding ready signal are activated at the rising edge of the global clock signal ACLK.

As shown in FIG. 12, the master interface activates the request valid signal ARVALID when transmitting a signal, and the slave interface activates the request ready signal ARREADY when ready to receive. Similarly, the slave interface activates the service valid signal RVALID when transmitting a signal and the master interface activates the service ready signal RREADY when ready to receive.

In FIG. 12, time points representing rising edges of the global clock signal ACLK are indicated as T0 to T13. The master interface transmits the read request signal ARADDR to the slave interface and activates the read valid signal ARVALID corresponding to the request signal. At time T2, both the valid signal ARVALID and the ready signal RREADY are activated so that the read request signal ARADDR is actually transferred. However, from the point of view of the master interface, time T1 may be determined as the request time point regardless of whether the ready signal RREADY of the slave interface is activated, that is, regardless of whether actual signal transfer is successful or not.

As a response to the read request, data D(A0), D(A1), D(A2) and D(A3) are transferred from the slave interface to the master interface by a burst transmission method. The slave interface activates the signal RLAST corresponding to the service done signal together with the transmission of the last data D(A3), and time T13 is determined as the request completion point. As such, the latency detector 540 of FIG. 10 detects the current latency CLAT, based on the request signals ARVALID and ARREADY and the service signals RVALID, RREADY and RLAST among the channel signals CHN between the master interface and the slave interface.

FIG. 13 is a block diagram illustrating a congestion monitor included in a computing system according to example embodiments. Referring to FIG. 13, a congestion monitor 500c may include a bandwidth monitor 530a, a latency monitor 530b, and a control core 530c. The bandwidth monitor 530a may have a configuration identical to or similar to that described with reference to FIG. 8, and the latency monitor 530b may have a configuration identical to or similar to that described with reference to FIG. 10.

The bandwidth monitor 530a may be enabled in response to a first enable signal EN1 and the latency monitor 530b may be enabled in response to a second enable signal EN2. When the bandwidth monitor 530a is enabled and the latency monitor 530b is disabled, the congestion monitor 500c performs substantially the same operation as the congestion monitor 500a described with reference to FIG. 8. When the bandwidth monitor 530a is disabled and the latency monitor 530b is enabled, the congestion monitor 500c performs substantially the same operation as the congestion monitor 500b described with reference to FIG. 10. When both the bandwidth monitor 530a and the latency monitor 530b are enabled, the control core 530c receives both the current bandwidth level BCL and the current latency level (LCL), and based on both, generates the congestion information CGI.

For example, the control core 530c may calculate an average level of the current bandwidth level BCL and the current latency level LCL and generate the congestion information CGI based on the average level. In some example embodiments, the control core 530c may assign different weights to the current bandwidth level BCL and the current latency level LCL to calculate a weighted average value, and generate the congestion information CGI based on the calculated weighted average value.

FIG. 14 is a flowchart illustrating a method of generating congestion information signals according to example embodiments. Referring to FIG. 14, a type of service requirement level may be determined based on characteristics of a computing system (S210).

The aforementioned bandwidth monitor may detect the amount of requested data (S220) and detect the amount of serviced data (S230). The bandwidth monitor may determine the current bandwidth level based on the amount of the requested data and the amount of the serviced data (S410). The aforementioned latency monitor may detect a service request time point (S240) and detect a service done time point (S250). The latency monitor may determine a current latency level based on the detected service request time point and service done time point (S420). The aforementioned control core may generate the congestion information based on at least one of the current bandwidth level and the current latency level (S430). As such, the congestion information CGI may be generated by selecting an appropriate service level according to the characteristics of the computing system, the overall request flow of the system may be promoted and the service (e.g., data transfer) quality may be improved.

FIG. 15 is a flowchart illustrating a method of controlling operations of a computing system according to example embodiments. Referring to FIG. 15, by a memory congestion monitor integrated in a memory device, memory congestion information may be generated by monitoring a congestion degree of signal transfers between the memory device and an interconnect device in real time (S100). The memory congestion information may be generated with various methods as described with reference to FIGS. 7 through 14. Whether to allocate a memory region to the memory device may be determined based on the memory congestion information (S210). Example embodiments of the memory region allocation are described with reference to FIGS. 6 through 17C.

FIG. 16 is a diagram illustrating an example embodiment of a software structure of a computing system according to example embodiments. FIG. 16 illustrated an example software architecture of a computing system. Referring to FIG. 16, a software layer structure of the computing system loaded into a working memory 1130 and driven by a processor (CPU) 1110 may include application programs 1132 and a kernel 1135 of an operating system (OS) 1134. The operating system 1134 may further include a device driver for managing various devices such as a memory, a modem, and an image processing device.

The application programs 1132 are upper layer software that is driven as a basic service or driven by a user's request. A plurality of application programs (APP0, APP1 and APP2) 1132 may be executed simultaneously to provide various services. The application programs 1132 may be executed by the processor 110 after being loaded into the working memory 1130. The kernel 1135 is a component of the operating system 1134 and performs control operations between the application program 1132 and hardware. The kernel 1135 may include a file system (FS), program execution, interrupts, multitasking, memory management, and device drivers. Also, the kernel 1135 may control allocation of a memory region of the host device based on memory congestion information CGI provided from the aforementioned memory congestion monitors CGM.

FIGS. 17A, 17B and 17C are diagrams for describing the method of FIG. 15. Referring to FIGS. 17A, 17B and 17C, a computing system 20 may include a plurality of host devices, for example, a first host device (HDV1) 21 and a second host device (HDV2) 22, a plurality of memory devices, for example, a first memory device (MEM1) 23, a second memory device (MEM2) 24 and a third memory device (MEM3) 25, and a CXL switch 400. The first memory device 23, the second memory device 24 and the third memory device MEM3 include a first memory congestion monitor CGM1, a second memory congestion monitor CGM2, and a third memory congestion monitor CGM3, respectively. Since the configuration of the computing system 20 and the port connection state of the CXL switch 400 of FIGS. 17A, 17B and 17C are substantially the same as those of FIG. 4, repeated descriptions may be omitted.

The first host device 21 and the second host device 22 may be respectively connected to a first root port and a second root port (e.g., 213 and 214 in FIG. 4) of a root complex defined by the CXL protocol. The first memory device 23 may be connected to the first root port and the second root port through a first virtual channel 221 and a second virtual channel 222, respectively. In other words, the memory device 23 may be accessed and shared by the first host device 21 and the second host device 22. The second memory device 24 may be accessed by the first host device 21 through the first virtual channel 221 and the third memory device 25 may be accessed by the second host device 22 through the second virtual channel 222. As a result, the first host device 21 may selectively allocate the first memory regions MR1 exclusive to the first host device 21 to the accessible first memory device 23 and the second memory device 24, and the host device 22 may selectively allocate the second memory regions MR2 exclusive to the second host device 22 to the accessible first memory device 23 and the third memory device 25.

For example, as illustrated in FIG. 17A, all memory regions of the second memory device 24 may correspond to first memory regions MR1 that are exclusively allocated to the first host device 21. Some memory regions of the third memory device 25 may be second memory regions MR2 corresponding to the second host device 22. Unallocated memory regions that have not yet been allocated are indicated by hatched lines.

In this case, when the first host device 21 additionally requires a new first memory region MR1, since there is no unallocated memory region in the second memory device 24, the first memory region MR1 is not allocated regardless of the above-described memory congestion information. A first memory region MR1 may be newly allocated to the first memory device 23 (NWAL in FIG. 17A).

After that, the second host device 22 may additionally require a new second memory region MR2. In this case, the second host device 22, as described above with reference to FIG. 6, may receive the memory congestion information provided from the first memory congestion monitor CGM1 in the first memory device 23 and the memory congestion information provided from the third memory congestion monitor CGM3 in the third memory device 25 based on the I/O protocol (CXL.io) according to the CXL protocol.

As described above, the memory congestion information may include a congestion flag FL. If FL=0, the signal transfer of the corresponding memory device is indicated as in the normal state; however, if FL=1, the signal transfer is indicated as congested. For example, as shown in FIG. 17B, the congestion flags FL provided from the first memory congestion monitor CGM1 and the third memory congestion monitor CGM3 both have a value of 0 and the first memory device 23 and the third memory device 25 may be all in the normal state. In this case, the second host device 22 may newly allocate the second memory region MR2 to the first memory device 23 having more unallocated memory regions (NWAL in FIG. 17B). Thereafter, the first host device 21 may perform a memory-intensive or data-intensive application, and signal transfer of the first memory device 23 may change to a congested state.

After that, the second host device 22 may additionally require a new second memory region MR2. The second host device 22 may receive the congestion flag (FL=1) indicating a congested state from the first memory congestion monitor CGM1 and the congestion flag (FL=0) indicating the normal state from the third memory congestion monitor CGM3. The second host device 22 avoids the first memory device 23 in the congested state and newly allocates the second memory region MR2 to the third memory device 25 in the normal state (NWAL in FIG. 17C).

The example embodiments have been described with a focus on the second host device 22 referring to FIGS. 17A, 17B, and 17C. It will be appreciated that the allocation of the memory region based on the memory congestion information may be applied to any host device that can access two or more memory devices. As such, one host device capable of accessing two or more memory devices may allocate, based on the memory congestion information provided from memory congestion monitors included in the two or more memory devices, a memory region corresponding to the one host device selectively to one of the two or more memory devices.

In a CXL memory pool environment in which two or more host devices are connected to one memory device, physically identical CXL memory expanders may be allocated to the host memory space by a CXL switch. When a specific host device dynamically allocates and uses a CXL memory device, how much of the corresponding CXL memory device is occupied by other host devices is not considered. Therefore, there is a possibility that performance degradation occurs due to saturation of signal transfer only in a specific CXL memory device, even though there is actually enough signal transfer in the other CXL memory device.

According to example embodiments, the memory congestion (i.e., the signal transfer congestion of a memory device) may be monitored in real time and a memory region may be allocated based on the monitoring result, thereby reducing signal transfer delay and improving the performance of the computing system.

FIG. 18 is a flowchart illustrating a method of controlling operations of a computing system according to example embodiments. Referring to FIG. 18, by a switch congestion monitor integrated in a CXL switch, switch congestion information may be generated by monitoring a congestion degree of a signal transfer path passing downstream ports of the CXL switch in real time (S120). The switch congestion monitor and the switch congestion information will be described below with reference to FIG. 19.

The port connection information of the CXL switch may be changed based on the switch congestion information (S200). The change of the port connection information based on the switch congestion information will be described below with reference to FIGS. 20A and 20B.

FIG. 19 is a block diagram illustrating an example embodiment of a compute express link (CXL) switch included in a computing system according to example embodiments. FIGS. 20A and 20B are diagrams for describing the method of FIG. 18.

Referring to FIG. 19, a CXL switch 401 may include one or more congestion monitors CGM as described above. The congestion monitors CGM included in each CXL switch 401 may be referred to as switch congestion monitors SCM. For convenience of illustration, only downstream ports for explaining the switch congestion monitor SCM are illustrated in FIG. 19. The switch congestion monitor SCM is integrated in each CXL switch 401, and monitors the congestion of a signal transfer path (i.e., channel) that passes downstream ports of each CXL switch 401 in real time to generate the switch congestion information.

For example, as shown in FIG. 19, the switch congestion monitor SCM may include a plurality of congestion monitors CGM that monitors in real time the congestion of the signal transfer path via the downstream ports DSP1, DSP2 and DSP3 to provide switch congestion information CGI1, CGI2 and CGI3, respectively. The switch congestion information CGI1, CGI2 and CGI3 generated by the switch congestion monitor SCM may be transferred to the fabric manager 212 based on the I/O protocol (CXL.io) included in the CXL protocol as described above with reference to FIG. 6.

As described above, the fabric manager 212 may manage the port map table PMT including the port connection information between upstream ports and downstream ports included in each CXL switch 401. The fabric manager 212 may change the port connection information for each CXL switch 401 based on the switch congestion information provided from each CXL switch 401.

Referring to FIGS. 20A and 20B, a computing system 30 may include a plurality of host devices HDV1, HDV2, HDV3 and HDV4, a plurality of memory devices MEM1, MEM2, MEM3 and MEM3, and an interconnect device. The interconnect device may include a plurality of CXL switches CSW11, CSW12, CSW21 and CSW22 and a universal switch USW. In FIGS. 20A and 20B, Uij (i and j are natural numbers) represents each upstream port, and Dij represents each downstream port.

In an example embodiment, the plurality of CXL switches CSW11, CSW12, CSW21 and CSW22 may be arranged in a multi-stage or nested structure layered with a plurality of stages. For example, the CXL switches CSW11 and CSW12 may belong to a first stage STG1 and the CXL switches CSW21 and CSW22 may belong to a second stage STG2. In this case, communication between the host device and the memory device may be performed via a plurality of CXL switches. The universal switch USW may connect the CXL switches CSW11 and CSW12 belonging to the first stage STG1 and the CXL switches CSW21 and CSW22 belonging to the second stage STG2 to each other. Based on the switch congestion information provided from the CXL switch. The fabric manager 212 may replace a first signal transfer path via a first downstream port of the CXL switch with a second signal transfer path via the universal switch USW and a second downstream port of the CXL switch.

For example, as shown in FIG. 20A, when the switch congestion information corresponding to the downstream port D11 of the CXL switch CSW11 is in the normal state, the first host device HDV1 and the first memory device MEM1 may communicate through a signal transfer path including ports U11, D11, U31 and D31, and the second host device HDV2 and the second memory device MEM2 may communicate through a signal transfer path including the ports U12, D11, U31 and D32. In other words, a channel between the ports D11 and U31 may be shared by the first host device HDV1 and the second host device HDV2 in the normal state.

Thereafter, the first host device HDV1 may perform a memory-intensive or data-intensive application, and the signal transfer via the downstream port D11 may be changed to the congested state. In this case, if the second host device HDV2 tries to use the signal transfer path monopolized by the first host device HDV1, routing assignment is not made, and starvation of the second host device HDV2 may occur or latency issues may occur.

When the channel between the ports D11 and U31 is in the congested state, for smooth communication between the second host device HDV2 and the second memory device MEM2, the fabric manager may change the port connection information of the port map table PMT, such that the signal transfer path of FIG. 20A via the ports U12 and D11 of the CXL switch CST11 and the ports U31 and D32 of the CXL switch CSW21 may be replaced with the signal transfer path of FIG. 20B via the ports U12 and D12 of the CXL switch CST11, the universal switch USW and the ports U32 and D32 of the CXL switch CSW21.

The fabric manager 212 may reconfigure the signal transfer path to reduce latency that may occur in a routing operation while tracking the congestion level of a specific path in real time based on the switch congestion information. In this manner, the signal transfer delay may be reduced of alleviated and the performance of the computing system may be improved by monitoring the switch congestion, that is, by monitoring the signal transfer congestion of the CXL switch in real time and changing the signal transfer path based on the monitoring result.

FIGS. 21 and 22 are diagrams illustrating example embodiments of a host device included in a computing system according to example embodiments. FIGS. 21 and 22 illustrate a CXL-protocol-based link as an example of an interconnect device between devices. Referring to FIG. 21, a system 100 may include various types of host devices. Although a host processor 110 and an accelerator 120 (e.g., a GPU and an FPGA) are illustrated as examples in FIG. 21, embodiments are not limited thereto. Various other types of devices configured to transmit an access request may be applied to the system 100. The host processor 110 and the accelerator 120 may transmit or receive messages and/or data to and from each other through a link 150 configured to support a CXL protocol. In some example embodiments, the host processor 110, which is a main processor, may be a CPU configured to control all operations of the system 100.

In addition, the system 100 may further include a host memory 130 connected to the host processor 110 and a device memory 140 mounted at the accelerator 120. The host memory 130 connected to the host processor 110 may support cache coherency. The device memory 140 may be managed by the accelerator 120 independently of the host memory 130. The host memory 130 and the device memory 140 may be accessed by a plurality of host devices. As an example, the accelerator 120 and devices, such as an NIC, may access the host memory 130 in a PCIe DMA manner.

In some example embodiments, the link 150 may support a plurality of protocols (e.g., sub-protocols) defined in the CXL protocol, and messages and/or data may be transferred through the plurality of protocols. For example, the protocols may include a non-coherent protocol (or an I/O protocol CXL.io), a coherent protocol (or a cache protocol CXL-.cache), and a memory access protocol (or a memory protocol CXL.memory).

The I/O protocol CXL.io may be an I/O protocol similar to PCIe. A shared memory (e.g., a pooled memory) included in the system 100 may communicate with the host devices based on the PCIe or the I/O protocol CXL.io. The memory device according to example embodiment shown in FIG. 1 may be accessed by the host processor 110 and the accelerator 120 through an interconnect device based on PCIe or the I/O protocol CXL.io. In addition, the cache protocol CXL.cache may provide a protocol via which the accelerator 120 may access the host memory 130, and the memory protocol CXL.memory may provide a protocol via which the host processor 110 may access the device memory 140.

The accelerator 120 may refer to an arbitrary device configured to provide functions to the host processor 110. For example, at least some of computing operations and I/O operations executed on the host processor 110 may be offloaded to the accelerator 120. In some embodiments, the accelerator 120 may include any one or any combination of a programmable component (e.g., a GPU and an NPU), a component (e.g., an IP core) configured to provide a fixed function, and a reconfigurable component (e.g., an FPGA).

The accelerator 120 may include a physical layer 121, a multi-protocol multiplexer (MUX) 122, an interface circuit 123, and an accelerator logic 124 and communicate with the device memory 140. The accelerator logic 124 may communicate with the host processor 110 through the multi-protocol MUX 122 and the physical layer 121 using the plurality of protocols.

The interface circuit 123 may determine one of the plurality of protocols based on messages and/or data for communication between the accelerator logic 124 and the host processor 110. The interface circuit 123 may be connected to at least one protocol queue included in the multi-protocol MUX 122 and may transmit and receive messages and/or data to and from the host processor 110 through the at least one protocol queue.

The multi-protocol MUX 122 may include at least one protocol queue and transmit and receive messages and/or data to and from the host processor 110 through at least one protocol queue. In some example embodiments, the multi-protocol MUX 122 may include a plurality of protocol queues corresponding respectively to the plurality of protocols supported by the link 150. In some embodiments, the multi-protocol MUX 122 may arbitrate between communications of different protocols and perform communication based on a selected protocol.

The device memory 140 may be connected to the accelerator 120 and be referred to as a device-attached memory. The accelerator logic 124 may communicate with the device memory 140 based on a protocol (i.e., a device-specific protocol) that is independent of the link 150. In some embodiments, the accelerator 120 may include a controller, which is a component for accessing the device memory 140, and the accelerator logic 124 may access the device memory 140 through the controller. The controller may access the device memory 140 of the accelerator 120 and also, enable the host processor 110 to access the device memory 140 through the link 150. In some embodiments, the device memory 140 may correspond to a CXL-based device-attached memory.

The host processor 110 may be a main processor (e.g., a CPU) of the system 100. In some example embodiments, the host processor 110 may be a CXL-based host processor or host. As shown in FIG. 21, the host processor 110 may be connected to the host memory 130 and include a physical layer 111, a multi-protocol MUX 112, an interface circuit 113, a coherence/cache circuit 114, a bus circuit 115, at least one core 116, and an I/O device 117.

At least one core 116 may execute an instruction and be connected to the coherence/cache circuit 114. The coherence/cache circuit 114 may include a cache hierarchy and be referred to as a coherence/cache logic. As shown in FIG. 21, the coherence/cache circuit 114 may communicate with the at least one core 116 and the interface circuit 113. For example, the coherence/cache circuit 114 may enable communication through at least two protocols including a coherent protocol and a memory access protocol. In some example embodiments, the coherence/cache circuit 114 may include a DMA circuit. The I/O device 117 may be used to communicate with the bus circuit 115. For example, the bus circuit 115 may be a PCIe logic, and the I/O device 117 may be a PCIe I/O device.

The interface circuit 113 may enable communication between components (e.g., the coherence/cache circuit 114 and the bus circuit 115) of the host processor 110 and the accelerator 120. In some example embodiments, the interface circuit 113 may enable communication between the components of the host processor 110 and the accelerator 120 according to a plurality of protocols (e.g., the non-coherent protocol, the coherent protocol, and the memory protocol). For example, the interface circuit 113 may determine one of the plurality of protocols based on the messages and/or data for communication between the components of the host processor 110 and the accelerator 120.

The multi-protocol MUX 112 may include at least one protocol queue. The interface circuit 113 may be connected to the at least one protocol queue and transmit and receive messages and/or data to and from the accelerator 120 through the at least one protocol queue. In some example embodiments, the interface circuit 113 and the multi-protocol MUX 112 may be integrally formed into one component. In some embodiments, the multi-protocol MUX 112 may include a plurality of protocol queues corresponding respectively to the plurality of protocols supported by the link 150. In some embodiments, the multi-protocol MUX 112 may arbitrate communications of different protocols and provide selected communications to the physical layer 111.

Moreover, according to example embodiments, a request generator of the host device shown in FIG. 1 may correspond to various components shown in FIG. 21 or be included in the components. For example, functions of the request generator may be performed by various components shown in FIG. 21, for example, the accelerator logic 124, the at least one core 116, and the I/O device 117.

FIG. 22 illustrates an example of a multi-protocol for communication in the computing system 100 of FIG. 21. Also, FIG. 22 illustrates an example in which each of the host processor 110 and the accelerator 120 includes a memory controller. The memory controller shown in FIG. 22 may include some of components included in each of the devices shown in FIG. 21 or be implemented separately from the components. The host processor 110 may communicate with the accelerator 120 based on a plurality of protocols. According to the above-described CXL examples, the plurality of protocols may include a memory protocol CXL.memory (or MEM), a coherent protocol CXL.cache (or COH), and a non-coherent protocol CXL.io (or IO). The memory protocol MEM may define transactions between a master and a subordinate. For example, the memory protocol MEM may define a transaction from the master to the subordinate and a transaction from the subordinate to the master. The coherent protocol COH may define interactions between the accelerator 120 and the host processor 110. For example, an interface of the coherent protocol COH may include three channels including a request, a response, and data. The non-coherent protocol IO may provide a non-coherent load/store interface for I/O devices.

The accelerator 120 may include a memory controller 125 configured to communicate with the device memory 140 and access the device memory 140. In some example embodiments, the memory controller 125 may be outside the accelerator 120 and integrated with the device memory 140. In addition, the host processor 110 may include a memory controller 118 configured to communicate with the host memory 130 and access the host memory 130. In some example embodiments, the memory controller 118 may be outside the host processor 110 and integrated with the host memory 130.

FIG. 23 is a diagram illustrating a computing system including a CXL-based Type 3 memory device according to example embodiments. Referring to FIG. 23, a system 300 may include a root complex 310 and a CXL memory expander 320 and a memory 330, which are connected to the root complex 310. The root complex 310 may include a home agent and an I/O bridge. The home agent may communicate with the CXL memory expander 320 based on a memory protocol CXL.memory, and the I/O bridge may communicate with the CXL memory expander 320 based on an I/O protocol CXL.io. Based on a CXL protocol, the home agent may correspond to an agent on the side of a host located to solve the coherency of the system 300 entirely for a given address.

The CXL memory expander 320 may include a memory controller (MC). FIG. 23 illustrates an example in which the memory controller includes a DMA engine 321 configured to control a data transfer path between a plurality of logical devices according to the above-described embodiments. However, embodiments are not limited thereto, and the DMA engine 321 may be outside the memory controller. In some example embodiments, the CXL memory expander 320 may output data to the root complex 310 through the I/O bridge based on the I/O protocol CXL.io or PCIe similar thereto.

Moreover, the memory 330 may include a plurality of memory regions (e.g., a first memory region LD0 to an n-th memory region LD(n−1)) according to the above-described embodiments, and each of the memory regions may be implemented as various units of memories. As an example, when the memory 330 includes a plurality of volatile or non-volatile memory chips, a unit of each of the memory region may be a memory chip. Alternatively, the memory 330 may be implemented such that the unit of each of the memory regions corresponds to one of various sizes (e.g., a semiconductor die, a block, a bank, and a rank) defined in a memory.

FIG. 24 is a block diagram illustrating a computing system according to example embodiments. Referring to FIG. 24, a system 700 may include a first CPU 721 and a second CPU 731, a first DDR (double data rate) memory 722 and a second DDR memory 732 connected to the first CPU 721 and the second CPU 731, respectively. The first CPU 721 and the second CPU 731 may be connected through an interconnection system based on processor interconnection technology. The interconnection system shown in FIG. 24 may provide a at least one CPU-to-CPU coherent link between CPUs.

The system 700 may include a first input-output device 723 in communication with a first CPU 721 and a first accelerator 724, and a first device memory 725 coupled to the first accelerator 724. The first CPU 721 may communicate with the first input-output device 723 and the first accelerator 724 through a bus. In addition, the system 700 may include a second input-output device 733 and a second accelerator 734 in communication with the second CPU 731, and a second device memory 735 connected to the second accelerator 734. The second CPU 731 may communicate with the second input-output device 733 and the second accelerator 734 through a bus. In some example embodiments, at least one of first device memory 725 and the second device memory 735 may be omitted from the system 700.

The system 700 may also include a remote memory 740. The first CPU 721 and the second CPU 731 may be respectively connected to the remote memory 740 through buses. The remote memory 740 may be used for memory expansion in system 700. In some example embodiments, the remote memory 740 may be omitted from system 700. The system 700 may perform communications based on at least some of a number of protocols over buses. Taking CXL as an example, information such as initial settings is transmitted based on the I/O protocol (CXL.io), data and/or messages are transmitted based on the cache protocol (CXL.cache) and/or memory protocol (CXL.memory).

In the system 700 shown in FIG. 24, the remote memory 740 may be shared by at least two host devices. FIG. 24 shows that the first and second CPUs 721 and 731 share the remote memory 740, but various other host devices may further share the remote memory 740. When the memory device according to example embodiments is applied to the remote memory 740, the remote memory 740 may include a plurality of logical devices recognized as different devices, and congestion degree of signal transfer may be monitored using the congestion monitor (CGM) 741.

FIG. 25 is a block diagram illustrating a data center including a computing system according to example embodiments. In some example embodiments, the system described above with reference to the drawings may serve as an application server and/or a storage server and be included in the data center 2000. In addition, the memory region allocation and/or the control of the signal transfer path according to example embodiments may be applied to each of the application server and/or the storage server.

Referring to FIG. 25, the data center 2000 may collect various pieces of data and provide services and be also referred to as a data storage center. For example, the data center 2000 may be a system configured to operate a search engine and a database or a computing system used by companies, such as banks, or government agencies. As shown in FIG. 25, the data center 2000 may include application servers 50_1 to 50_n and storage servers 60_1 to 60_m (here, each of m and n is an integer more than 1). The number n of application servers 50_1 to 50_n and the number m of storage servers 60_1 to 60_m may be variously selected according to embodiments. The number n of application servers 50_1 to 50_n may be different from the number m of storage servers 60_1 to 60_m.

The application servers 50_1 to 50_n may include any one or any combination of processors 51_1 to 51_n, memories 52_1 to 52_n, switches 53_1 to 53_n, NICs 54_1 to 54_n, and storage devices 55_1 to 55_n. The processors 51_1 to 51_n may control all operations of the application servers 50_1 to 50_n, access the memories 52_1 to 52_n, and execute instructions and/or data loaded in the memories 52_1 to 52_n. Non-limiting examples of the memories 52_1 to 52_n may include DDR SDRAM, a high-bandwidth memory (HBM), a hybrid memory cube (HMC), a dual in-line memory module (DIMM), a Optane DIMM, or a non-volatile DIMM (NVDIMM).

According to example embodiments, the numbers of processors and memories included in the application servers 50_1 to 50_n may be variously selected according to embodiments. In some embodiments, the processors 51_1 to 51_n and the memories 52_1 to 52_n may provide processor-memory pairs. In some embodiments, the number of processors 51_1 to 51_n may be different from the number of memories 52_1 to 52_n. The processors 51_1 to 51_n may include a single core processor or a multi-core processor. In some embodiments, as illustrated with a dashed line in FIG. 25, the storage devices 55_1 to 55_n may be omitted from the application servers 50_1 to 50_n. The number of storage devices 55_1 to 55_n included in the storage servers 50_1 to 50_n may be variously selected according to embodiments. The processors 51_1 to 51_n, the memories 52_1 to 52_n, the switches 53_1 to 53_n, the NICs 54_1 to 54_n, and/or the storage devices 55_1 to 55_n may communicate with each other through a link described above with reference to the drawings.

The storage servers 60_1 to 60_m may include any one or any combination of processors 61_1 to 61_m, memories 62_1 to 62_m, switches 63_1 to 63_m, NICs 64_1 to 64_n, and storage devices 65_1 to 65_m. The processors 61_1 to 61_m and the memories 62_1 to 62_m may operate similar to the processors 51_1 to 51_n and the memories 52_1 to 52_n of the application servers 50_1 to 50_n described above.

The application servers 50_1 to 50_n may communicate with the storage servers 60_1 to 60_m through a network 70. In some embodiments, the network 70 may be implemented using a fiber channel (FC) or Ethernet. The FC may be a medium used for relatively high-speed data transfer. An optical switch that provides high performance and high availability may be used as the FC. The storage servers 60_1 to 60_m may be provided as file storages, block storages, or object storages according to an access method of the network 70.

In some example embodiments, the network 70 may be a storage-only network, such as a storage area network (SAN). For example, the SAN may be an FC-SAN, which may use an FC network and be implemented using an FC Protocol (FCP). In another case, the SAN may be an Internet protocol (IP)-SAN, which uses a transmission control protocol/Internet protocol (TCP/IP) network and is implemented according to an SCSI over TCP/IP or Internet SCSI (ISCSI) protocol. In some embodiments, the network 70 may be a general network, such as a TCP/IP network. For example, the network 70 may be implemented according to a protocol, such as FC over Ethernet (FCOE), network attached storage (NAS), non-volatile memory express (NVMe) over fabrics (NVMe-oF).

The application server 50_1 and the storage server 60_1 will mainly be described below, but it may be noted that a description of the application server 50_1 may be also applied to another application server (e.g., 50_n), and a description of the storage server 60_1 may be also applied to another storage server (e.g., 60_m). The application server 50_1 may store data, which is requested to be stored by a user or a client, in one of the storage servers 60_1 to 60_m through the network 70. In addition, the application server 50_1 may obtain data, which is requested to be read by the user or the client, from one of the storage servers 60_1 to 60_m through the network 70. For example, the application server 50_1 may be implemented as a web server or a database management system (DBMS).

The application server 50_1 may access the memory 52_n and/or the storage device 55_n included in another application server 50_n, through the network 70, and/or access memories 62_1 to 62_m and/or the storage devices 65_1 to 65_m included in the storage servers 60_1 to 60_m, through the network 70. Accordingly, the application server 50_1 may perform various operations on data stored in the application servers 50_1 to 50_n and/or the storage servers 60_1 to 60_m. For example, the application server 50_1 may execute an instruction to migrate or copy data between the application servers 50_1 to 50_n and/or the storage servers 60_1 to 60_m. In this case, the data may be migrated from the storage devices 65_1 to 65_m of the storage servers 60_1 to 60_m to the memories 52_1 to 52_n of the application servers 50_1 to 50_n through the memories 62_1 to 62_m of the storage servers 60_1 to 60_m or directly. In some embodiments, the data migrated through the network 70 may be encrypted data for security or privacy.

In the storage server 60_1, an interface IF may provide physical connection between the processor 61_1 and a controller CTRL and physical connection between the NIC 64_1 and the controller CTRL. For example, the interface IF may be implemented using a direct attached storage (DAS) method in which the storage device 65_1 is directly connected to a dedicated cable. For example, the interface IF may be implemented using various interface methods, such as advanced technology attachment (ATA), serial ATA (SATA), external SATA (e-SATA), small computer small interface (SCSI), serial attached SCSI (SAS), PCI, PCIe, NVMe, IEEE 1394, a universal serial bus (USB), a secure digital (SD) card, a multi-media card (MMC), an embedded MMC (eMMC), a UFS, an embedded UFS (eUFS), and a compact flash (CF) card interface.

In the storage server 60_1, the switch 63_1 may selectively connect the processor 61_1 to the storage device 65_1 or selectively connect the NIC 64_1 to the storage device 65_1 based on the control of the processor 61_1. In some example embodiments, the NIC 64_1 may include a network interface card (NIC) and a network adaptor. The NIC 54_1 may be connected to the network 70 through a wired interface, a wireless interface, a bluetooth interface, or an optical interface. The NIC 54_1 may include an internal memory, a digital signal processor (DSP), and a host bus interface and be connected to the processor 61_1 and/or the switch 63_1 through the host bus interface. In some embodiments, the NIC 64_1 may be integrated with any one or any combination of the processor 61_1, the switch 63_1, and the storage device 65_1.

In the application servers 50_1 to 50_n or the storage servers 60_1 to 60_m, the processors 51_1 to 51_m and 61_1 to 61_n may transmit commands to the storage devices 55_1 to 55_n and 65_1 to 65_m or the memories 52_1 to 52_n and 62_1 to 62_m and program or read data. In this case, the data may be data of which an error is corrected by an error correction code (ECC) engine. The data may be data processed with data bus inversion (DBI) or data masking (DM) and include cyclic redundancy Code (CRC) information. The data may be encrypted data for security or privacy.

In response to read commands received from the processors 51_1 to 51_m and 61_1 to 61_n, the storage devices 55_1 to 55_n and 65_1 to 65_m may transmit control signals and command/address signals to a non-volatile memory device (e.g., a NAND flash memory device) NVM. Accordingly, when data is read from the non-volatile memory device NVM, a read enable signal may be input as a data output control signal to output the data to a DQ bus. A data strobe signal may be generated using the read enable signal. The command and the address signal may be latched according to a rising edge or falling edge of a write enable signal.

The controller CTRL may control all operations of the storage device 65_1. In embodiments, the controller CTRL may include static RAM (SRAM). The controller CTRL may write data to the non-volatile memory device NVM in response to a write command or read data from the non-volatile memory device NVM in response to a read command. For example, the write command and/or the read command may be generated based on a request provided from a host (e.g., the processor 61_1 of the storage server 60_1, the processor 61_m of another storage server 60_m, or the processors 51_1 to 51_n of the application servers 50_1 to 50_n). A buffer BUF may temporarily store (or buffer) data to be written to the non-volatile memory device NVM or data read from the non-volatile memory device NVM. In some embodiments, the buffer BUF may include DRAM. The buffer BUF may store metadata. The metadata may refer to user data or data generated by the controller CTRL to manage the non-volatile memory device NVM. The storage device 65_1 may include a secure element (SE) for security or privacy.

The inventive concept may be applied to any electronic devices and systems. For example, the inventive concept may be applied to systems such as a memory card, a solid state drive (SSD), an embedded multimedia card (eMMC), a universal flash storage (UFS), a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a server system, an automotive driving system, a data center, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A computing system, comprising:
    an interconnect device;
    a plurality of memory devices electrically coupled to communicate with the interconnect device;
    a plurality of host devices electrically coupled to communicate with the interconnect device and configured to generate requests for access to the plurality of memory devices via the interconnect device; and
    a plurality of congestion monitors configured to generate congestion information by monitoring a congestion degree of signal transfers between at least one of the plurality of memory devices and the interconnect device in real time, wherein the plurality of congestion monitors are in the interconnect device; and
    wherein the computing system is configured to control at least one of: a memory region allocation of the plurality of host devices to the plurality of memory devices, and a signal transfer path inside the interconnect device, based on the congestion information, and
    wherein the plurality of memory devices comprise computer-readable memory.

2. The computing system of claim 1, wherein at least one of the plurality of congestion monitors includes:
    a memory congestion monitor integrated within a memory device of the plurality of memory devices and configured to generate memory congestion information by monitoring a congestion degree of signal transfers between the memory device and the interconnect device in real time.

3. The computing system of claim 2, wherein a host device of the plurality of host devices is configured to determine whether to allocate a memory region to the memory device based on the memory congestion information.

4. The computing system of claim 2, wherein the plurality of host devices include a host device connected to one root port of a root complex, which is defined by a compute express link (CXL) protocol; and wherein the plurality of memory devices include two or more memory devices connected to the root port through a plurality of virtual channels.

5. The computing system of claim 4, wherein the host device is configured to allocate a memory region corresponding to the host device selectively to the two or more memory devices based on the memory congestion information provided from memory congestion monitors respectively included in the two or more memory devices.

6. The computing system of claim 2, wherein a host device of the plurality of host devices is configured to receive the memory congestion information from the memory congestion monitor through a mailbox interface defined by a compute express link (CXL) protocol.

7. The computing system of claim 1, wherein the interconnect device includes:

a plurality of switches including upstream ports and downstream ports defined by a compute express link (CXL) protocol; and a fabric manager configured to manage a port map table including port connection information on connections between the upstream ports and the downstream port of a switch within the plurality of switches.

8. The computing system of claim 7, wherein the plurality of the congestion monitors include:

a switch congestion monitor integrated within the switch and configured to generate switch congestion information by monitoring a congestion degree of a signal transfer path passing the downstream ports of the switch in real time.

9. The computing system of claim 8, wherein the fabric manager is configured to change the port connection information of the switch based on the switch congestion information provided from the switch.

10. The computing system of claim 8, wherein the interconnect device further includes a universal switch connecting the plurality of switches.

11. The computing system of claim 10, wherein the fabric manager is configured to replace a first signal transfer path passing a first downstream port of the switch with a second signal transfer path passing the universal switch and a second downstream port of the switch, based on the switch congestion information provided from the switch.

12. The computing system of claim 8, wherein the fabric manager is configured to receive the switch congestion information from the switch congestion monitor through the CXL protocol.

13. The computing system of claim 1, wherein a congestion monitor of the plurality of congestion monitors includes:

a performance monitor configured to generate a current congestion level by detecting the congestion degree of the signal transfers; and a control core configured to generate the congestion information based on the current congestion level.

14. The computing system of claim 13, wherein the performance monitor includes at least one of:

a bandwidth monitor configured to generate a current bandwidth level by detecting a bandwidth corresponding to the congestion degree of the signal transfers in real time; and a latency monitor configured to generate a current latency level by detecting a latency corresponding to the congestion degree of the signal transfers in real time.

15. The computing system of claim 14, wherein the bandwidth monitor includes:

a requested data detector configured to generate a level increase signal based on a data amount related with the requests from the plurality of host devices;

a serviced data detector configured to generate a level decrease signal based on a data amount that is serviced in response to the requests; and a virtual buffer configured to generate the current bandwidth level based on the level increase signal and the level decrease signal.

16. The computing system of claim 14, wherein the latency monitor includes:

a latency detector configured to generate a current latency based on channel signals;

a subtractor configured to calculate a difference between a reference latency and the current latency to generate a latency difference value; and an accumulator configured to accumulate the latency difference value to generate the current latency level.

17. The computing system of claim 1, wherein the plurality of memory devices includes at least one Type-3 pooled memory defined by a compute express link (CXL) protocol.

18. A computing system, comprising:

a compute express link (CXL) interconnect device including a plurality of CXL switches;

a plurality of memory devices electrically coupled to communicate with the CXL interconnect device;

a plurality of host devices electrically coupled to communicate with the CXL interconnect device and configured to generate requests for access to the plurality of memory devices; and a plurality of congestion monitors configured to generate congestion information by monitoring a congestion degree of signal transfers between at least one of the plurality of memory devices and the CXL interconnect device in real time, wherein the plurality of congestion monitors are in the interconnect device; and wherein the computing system is configured to control at least one of: a memory region allocation of the plurality of host devices to the plurality of memory devices, and a signal transfer path inside the CXL interconnect device, based on the congestion information, and wherein the plurality of memory devices comprise computer-readable memory.

19. The computing system of claim 18, wherein each of the plurality of congestion monitors include:

a memory congestion monitor integrated in a memory device of the plurality of memory devices and configured to generate memory congestion information by monitoring a congestion degree of signal transfers between the memory device and the interconnect device in real time; and a switch congestion monitor integrated in a CXL switch of the plurality of CXL switches and configured to generate switch congestion information by monitoring a congestion degree of a signal transfer path passing downstream ports of the CXL switch in real time.

20. A method of controlling operations of a computing system including a plurality of host devices and a plurality of memory devices that communicate with each other through an interconnect device, the method comprising:

generating, by a plurality of congestion monitors in the interconnect device, congestion information by monitoring a congestion degree of signal transfers between at least one of the plurality of memory devices and the interconnect device in real time; and controlling at least one of a memory region allocation of a plurality of host devices to the plurality of memory devices and a signal transfer path inside the interconnect device based on the congestion information, and wherein the plurality of memory devices comprise computer-readable memory.

* * * * *